United States Patent
Minami et al.

(10) Patent No.: US 7,250,211 B1
(45) Date of Patent: *Jul. 31, 2007

(54) POLYPROPYLENE FILMS AND MULTILAYERED LAMINATE

(75) Inventors: Yutaka Minami, Chiba (JP); Masami Kanamaru, Chiba (JP); Hideo Funabashi, Chiba (JP); Yasushi Seta, Chiba (JP); Masahiko Endoh, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/110,193

(22) PCT Filed: Oct. 24, 2000

(86) PCT No.: PCT/JP00/07409

§ 371 (c)(1),
(2), (4) Date: Apr. 16, 2002

(87) PCT Pub. No.: WO01/30891

PCT Pub. Date: May 3, 2001

(30) Foreign Application Priority Data

Oct. 26, 1999 (JP) ............... 11/303522
Nov. 5, 1999 (JP) ............... 11/315126
Feb. 16, 2000 (JP) ............ 2000-037617

(51) Int. Cl.
*B32B 15/04* (2006.01)
*B32B 27/08* (2006.01)
*B32B 27/32* (2006.01)
*C08F 110/06* (2006.01)

(52) U.S. Cl. ............... 428/355 EN; 428/516; 428/523; 526/351; 526/348

(58) Field of Classification Search ............ 526/567, 526/886, 901, 902, 903, 904, 905, 906, 351, 526/348, 160, 161, 172; 428/500, 516, 523, 428/355 EN
See application file for complete search history.

(56) References Cited

U.S. PATENT DOCUMENTS

| 5,693,414 | A | * | 12/1997 | Peiffer et al. | 428/327 |
| 5,959,046 | A | * | 9/1999 | Imuta et al. | 526/127 |
| 6,316,561 | B1 | * | 11/2001 | Kanzawa | 526/160 |
| 6,339,135 | B1 | * | 1/2002 | Kashiwamura et al. | 526/160 |
| 6,414,090 | B2 | * | 7/2002 | Minami et al. | 525/338 |
| 6,558,808 | B1 | * | 5/2003 | Dries et al. | 428/516 |
| 6,562,886 | B1 | * | 5/2003 | Minami et al. | 524/115 |
| 6,734,270 | B1 | * | 5/2004 | Minami et al. | 526/351 |
| 6,906,155 | B1 | * | 6/2005 | Minami et al. | 526/160 |

FOREIGN PATENT DOCUMENTS

| EP | 432452 A | * | 6/1991 |
| EP | 0 716 121 | | 6/1996 |
| EP | 0818458 | * | 1/1998 |
| EP | 0 987 290 | | 3/2000 |
| EP | 1 227 112 | | 7/2002 |
| EP | 1 231 226 | | 8/2002 |
| EP | 1 241 206 | | 9/2002 |
| EP | 1 243 612 | | 9/2002 |
| JP | 60-55046 | | 3/1985 |
| JP | 4-97843 | | 3/1992 |
| JP | 7-329260 | | 12/1995 |
| JP | 9-151213 | | 6/1997 |
| JP | 9-208629 | | 8/1997 |
| JP | 10-259207 | * | 9/1998 |
| JP | 11-1584 | | 1/1999 |
| JP | 11-060833 | | 3/1999 |
| JP | 11-106433 | | 4/1999 |
| JP | 11-302474 | * | 11/1999 |
| WO | WO 97/10300 | | 3/1997 |
| WO | 99/09098 | | 2/1999 |

OTHER PUBLICATIONS

U.S. Appl. No. 10/509,339, filed Oct. 8, 2004, Minami et al.
U.S. Appl. No. 10/110,193, filed Apr. 16, 2002, Minami et al.
U.S. Appl. No. 10/855,964, filed May 28, 2004, Minami et al.
U.S. Appl. No. 10/258,608, filed Nov. 5, 2002, Seta et al.
U.S. Appl. No. 10/089,066, filed Apr. 5, 2002, Minami et al.
U.S. Appl. No. 10/110,204, filed Apr. 17, 2002, Minami et al.

* cited by examiner

*Primary Examiner*—Kevin R. Kruer
(74) *Attorney, Agent, or Firm*—Oblon, Spivak, McClelland, Maier & Neustadt, P.C.

(57) ABSTRACT

Heat-sealing polypropylene films having specific characteristics, and being well-balanced between a tensile modulus and a heat seal temperature, less tacky, and excellent in processability, transparency and impact resistance, as well as being excellent in resistance to whitening due to peeling, softness and impact resistance. A multilayered heat-sealing polyolefin resin laminate having at least one outermost layer produced from the above heat-sealing propylene polymers exhibits excellent low-temperature heat sealability and sufficient interlaminar strength without the use of an adhesive. The heat-sealing propylene polymers are produced by polymerizing propylene or polymerizing propylene with ethylene and/or $C_4$-$C_{20}$ α-olefin in the presence of a polymerization catalyst containing a transition metal compound represented by the following formula (I):

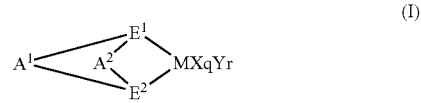

(I)

wherein $A^1$, $A^2$, $E^1$, $E^2$, M, X, Y, q and r are as defined in the specification.

10 Claims, No Drawings

POLYPROPYLENE FILMS AND MULTILAYERED LAMINATE

This application is a 35 U.S.C. 371 national stage filing of International Application No. PCT/JP00/007409, filed 24 Oct. 2000, which claims priority to Japanese Application 11/303522, filed Oct. 26, 1999; JP 11/315126, filed Nov. 5, 1999; and JP-2000-37617 filed Feb. 16, 2000.

TECHNICAL FIELD

The present invention relates to a novel polypropylene film usable as a substitute for soft vinyl chloride films. More particularly, the present invention relates to a novel polypropylene-based film that is less tacky, well-balanced between a tensile modulus and a heat seal temperature, and excellent in processability, transparency and impact resistance, and also relates to a novel polypropylene film that is less tacky and excellent in resistance to whitening due to peeling, softness and impact resistance. The present invention further relates to a multilayered polyolefin resin laminate, more particularly, to a multilayered polyolefin resin laminate that exhibits excellent low-temperature heat sealability and attains sufficient interlaminar strength without using an adhesive or the like.

BACKGROUND ART

Vinyl chloride resins are widely used as soft resin. However, it is known that the vinyl chloride resins generate harmful substances upon burning. For this reason, it has been strongly required to develop a substitute resin. Recently, there have been used, as a substitute resin, olefin polymers produced by using a metallocene catalyst. Example of these olefin polymers include a copolymer of ethylene and α-olefin. However, such a copolymer poses a problem that it becomes too tacky when softened. Further, shaped articles, such as film, produced from the copolymer have poor surface properties because of deteriorated transparency, rigidity and low-temperature heat sealability, thereby rendering it unsatisfactory. The copolymer is also poor in processability.

Crystalline propylene polymer films are widely used as a packaging film owing to their excellent rigidity, transparency and moisture resistance. The crystalline propylene polymer films may be used alone as monolayered films, or in combination with films of ethylene-vinyl acetate copolymer, linear polyethylene or the like as multilayered laminate films. For their use, the packaging films are often processed into bags, regardless of whether the films are monolayered or multilayered. A series of processes for forming a film into a bag and closing the opening of the bag after putting contents therein is generally carried out by pressing the film edges with a heated rod and melt-welding the edges to each other (so called "heat sealing"). Recently, it has been required to speed up the bag-forming and packaging processes for increased productivity, which results in great demands for materials with good heat sealability. Also, it has been required for the film to inevitably have slipping and anti-blocking properties so that the above fabrication process can be efficiently made.

However, films of propylene homopolymers are defective in that, when heat sealed, the films need to be pressed at high temperature for a long time. To overcome such a drawback, there has been commonly used a technique of copolymerizing propylene with ethylene, 1-butene or any other α-olefin. However, in the conventional technique, it is necessary to copolymerize propylene with a large amount of comonomer including ethylene, 1-butene or other α-olefin so as to obtain copolymers having satisfactory heat sealability. Further, these comonomers often remain dominantly in the low-molecular fractions to form a tacky low-crystalline component that makes the copolymers tacky (such a component is hereinafter referred to as "tacky component"). As a result, films of the copolymers fails to show a good rigidity that is intrinsic to polypropylene films, and tend to cause blocking between films, thereby impeding the fabrication process. In addition, the whitening of films due to bleeding occurs to deteriorate the appearance of films. For these reasons, the copolymers are not applicable to practical use. Heretofore, it has been attempted to remove the tacky component by dissolving them in an inert solvent. It is however difficult to wash out the tacky component efficiently while preventing the low-temperature melting component that contribute to heat sealability from being lost by the washing, this making the washing method unsatisfactory for industrial use.

Recently, the film forming process has come to be conduced by using a large film forming machine to speed up the process for increased productivity, this changing the film-forming conditions. The quality of films needs to be maintained regardless the change in the film-forming conditions. On the other hand, there is a problem that multilayered laminates fails to show sufficient interlaminar strength when produced without using an adhesive and the like. It is therefore necessary to adhere films by using an adhesive in order to impart excellent properties of low-temperature heat sealability, rigidity, transparency, moisture resistance and the like to the multilayered laminates.

Thus, a first object of the present invention is to provide a polypropylene film that is less tacky, well-balanced between a tensile modulus and a heat seal temperature, and excellent in processability, transparency and impact resistance. A second object of the present invention is to provide a polypropylene film that is less tacky and excellent in resistance to whitening due to peeling, softness and impact resistance. A third object of the present invention is to provide a multilayered polyolefin resin laminate having an excellent low-temperature heat sealability and exhibiting a sufficient interlaminar strength without using an adhesive or the like.

DISCLOSURE OF THE INVENTION

As a result of extensive research, the inventors have found that the above objects are achieved by a polypropylene film satisfying a specific relationship between a tensile modulus TM (MPa) and a heat seal temperature HST (° C.), and a polypropylene film having a limited tensile modulus TM and a limited intrinsic viscosity [η] as measured at 135° C. in tetralin, and exhibiting no melting point or exhibiting a melting point Tm (° C.) satisfying a specific relationship with TM when measurable by differential scanning calorimeter (DSC). The inventors have further found that the above object is achieved by a multilayered polyolefin resin laminate in which at least one outermost layer is produced from a specific propylene polymer. The present invention has been accomplished based on these findings.

Thus, according to a first aspect of the present invention, there is provided a polypropylene film satisfying the following formula:

$$TM \geq 12.5 \times HST - 900$$

wherein TM is a tensile modulus (MPa) and HST is a heat seal temperature (° C.).

The polypropylene film mentioned above may be produced from a propylene polymer (A) satisfying the following requirements of:

(1) having a component soluble in a 25° C. hexane in a content (H25) of 0 to 80% by weight;

(2) having, when measured by a differential scanning calorimeter (DSC), no melting point or a melting point Tm (° C.) satisfying the following formula:

$$\Delta H \geq 6 \times (Tm-140)$$

wherein ΔH is a melting endotherm (J/g); and (3) having an intrinsic viscosity [η] of 0.5 to 15 dL/g as measured at 135° C. in tetralin.

The polypropylene film may be preferably produced from a propylene homopolymer (A-1) having:

(1) a meso pentad fraction [mmmm] of from 20 to 80 mol %; and (2) a racemic pentad fraction [rrrr] satisfying, together with 1−[mmmm], the following formula:

$$[rrrr]/(1-[mmmm]) \leq 0.1.$$

The propylene polymer (A) and propylene homopolymer (A-1) are produced by polymerizing propylene, or polymerizing propylene with ethylene and/or $C_4$-$C_{20}$ α-olefin, in the presence of a polymerization catalyst comprising:

(A) a transition metal compound represented by the following general formula (I):

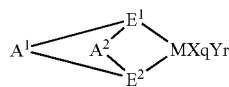

wherein $A^1$, $A^2$, $E^1$, $E^2$, M, X, Y, q and r are as defined hereinafter; and (B) at least one component selected from the group consisting of a compound (B-1) capable of forming an ionic complex by reacting with the transition metal compound (A) or a derivative thereof, and an aluminoxane (B-2).

According to a second aspect of the present invention, there is provided a polypropylene film satisfying the following requirements of:

(1) having a tensile modulus (TM) of from 5 to 500 MPa;

(2) having, when measured by a differential scanning calorimeter (DSC), no melting point or a melting point Tm (° C.) satisfying the following formula:

$$TM \geq 5 \times Tm-450; \text{ and}$$

(3) having an intrinsic viscosity [η] of from 1 to 3 dL/g as measured at 135° C. in tetralin.

The polypropylene-based film of the second aspect may be produced from the propylene polymer (A), preferably the propylene homopolymer (A-1).

According to a third aspect of the present invention, there is provided a multilayered polyolefin resin laminate, wherein at least one outermost layer is produced from a propylene polymer (A) satisfying the following requirements of:

(1) having a component soluble in a 25° C. hexane in a content (H25) of 0 to 80% by weight;

(2) having, when measured by a differential scanning calorimeter (DSC), no melting point or a melting point Tm (° C.) satisfying the following formula:

$$\Delta H \geq 6 \times (Tm-140)$$

wherein ΔH is a melting endotherm (J/g)

The at least one outermost layer is preferably produced from the propylene polymer (A-1) or a propylene copolymer (A-2) described below.

BEST MODE FOR CARRYING OUT THE INVENTION

The present invention will be described below in detail.

(I) First Polypropylene Film

The first polypropylene film satisfying the following formula:

$$TM \geq 12.5 \times HST-900, \text{ preferably}$$

$$TM \geq 12.5 \times HST-800 \text{ and } HST \leq 130, \text{ more preferably}$$

$$TM \geq 12.5 \times HST-750 \text{ and } HST \leq 130$$

wherein TM is a tensile modulus (MPa) and HST is a heat seal temperature (° C.). The tensile modulus TM is preferably from 5 to 1,000 MPa. The TM and HST measuring methods are described in detail in Examples below.

The first polypropylene film is, as described above, well-balanced between the tensile modulus and the heat seal temperature, i.e., exhibits a high rigidity and an excellent low-temperature heat sealability, so that the film is suitably used as food packaging films, agricultural films (for use in, e.g., a vinyl plastic greenhouse) and sealant films. The polypropylene film incapable of satisfying the above formula fails to be balanced in the tensile modulus and the heat sealability, thereby rendering it unsatisfactory.

Further, the first polypropylene film prevents the tacky component from bleeding out into the surface and is therefore less tacky, when produced from a propylene polymer having, as described below in detail, a limited H25, a narrow molecular weight distribution (Mw/Mn), and a small amount of a fraction extractable with boiling diethyl ether. The first propylene film exhibits not only excellent surface properties but also an excellent processability because of its less stickiness.

The first polypropylene film has an internal haze of 5% or less, preferably 3% or less as determined from its haze value measured according to JIS K-7105, and therefore, exhibits excellent transparency. Also, the first polypropylene film has an impact resistance of 10,000 $J/m^2$ or higher, preferably 15,000 $J/m^2$ or higher as measured by a film impact tester available from Toyo Seiki Seisaku-Sho, Co., Ltd. using a ½ inch impact head, and therefore, exhibits an excellent impact resistance.

Specifically, as the first polypropylene film of the present invention, there may be exemplified a film produced from a propylene polymer (A) described below.

(I-1) Propylene Polymer (A)

The propylene polymer (A) satisfies the following requirements of:

(1) having a component soluble in a 25° C. hexane in a content (H25) of 0 to 80% by weight;

(2) having, when measured by DSC, no melting point or a melting point Tm (° C.) satisfying the following formula:

$$\Delta H \geq 6 \times (Tm-140)$$

wherein ΔH is a melting endotherm (J/g); and (3) having an intrinsic viscosity [η] of 0.5 to 15 dL/g as measured at 135° C. in tetralin.

The use of the propylene polymer (A) satisfying the above requirements (1) to (3) enables the production of a polypropylene film that is less tacky, well-balanced between the tensile modulus and the heat seal temperature, and excellent in processability, transparency and impact resistance.

The content (H25) of 25° C. hexane soluble of the propylene polymer (A) used in the present invention is 0 to 80% by weight, preferably 0 to 50% by weight, more preferably 0 to 25% by weight, still more preferably 0 to 10% by weight, and most preferably 0 to 5% by weight. H25 is an index showing a content of so-called tacky components that is responsible for the tackiness and the deterioration of transparency. A higher H25 means a larger content of the tacky components. When H25 exceeds 80% by weight, the film tends to be deteriorated in anti-blocking properties and transparency because of a large content of the tacky components. The H25 is a weight reduction rate calculated from the following formula:

$$H25=[(W_0-W_1)/W_0]\times 100 \; (\%)$$

wherein $W_0$ is an initial weight of the propylene polymer (A); and $W_1$ is a weight of a dried propylene polymer (A) after immersed in 200 mL of hexane at 25° C. for 3 days or longer.

Further, the propylene polymer (A) used in the present invention shows, when measurable by DSC, no melting point or a melting point Tm (° C.) satisfying the following relationship with the melting endotherm $\Delta H$ (J/g) represented by the following formula:

$$\Delta H \geq 6\times(Tm-140), \text{ preferably}$$

$$\Delta H \geq 3\times(Tm-120), \text{ more preferably}$$

$$\Delta H \geq 2\times(Tm-100).$$

Showing no melting point Tm (° C.) in DSC measurement suggests that the heat seal temperature can be lowered, i.e., means an excellent low-temperature heat sealability. Also, showing a melting point Tm (° C.) satisfying the above relationship between Tm and the melting endotherm $\Delta H$ (J/g) means that the melting endotherm is high for the melting point and shaped articles such as films are excellent in rigidity such as a tensile modulus and an impact resistance. Tm and $\Delta H$ are determined by DSC measurement. Namely, by using a differential scanning colorimeter ("DSC-7" available from Perkin-Elmer Corp.), 10 mg of a sample was melted by heating at 230° C. for 3 min in nitrogen atmosphere, and then cooled to 0° C. at a rate of 10° C./min. The cooled sample was allowed to stand at 0° C. for 3 min, and then heated at a temperature rise rate of 10° C./min to obtain a melting endotherm. The peak top of the maximum peak in the melting endotherm curve is the melting point Tm, and the melting endotherm during the melting is $\Delta H$ (J/g).

The propylene polymer (A) used in the present invention also has an intrinsic viscosity [η] of 0.5 to 15 dL/g as measured at 135° C. in tetralin. In particular, when the propylene polymer (A) is used for producing the first polypropylene film, the intrinsic viscosity [η] is preferably 1 to 3 dL/g, more preferably 1 to 2.5 dL/g. When the intrinsic viscosity is less than 0.5 dL/g, the polymer becomes sticky. When the intrinsic viscosity exceeds 15 dL/g, the polymer has a poor processability due to deteriorated melt fluidity.

Further, the propylene polymer (A) used in the present invention preferably has a molecular weight distribution (Mw/Mn) of 1.5 to 4.0, more preferably 1.5 to 3.5, most preferably 1.5 to 3.0 as measured by gel permeation chromatography (GPC). When the molecular weight distribution (Mw/Mn) is less than 1.5, the polymer is deteriorated in processability. When exceeding 4.0, the polymer tends to become sticky. The apparatus and measuring conditions for GPC will be described in Examples below.

The propylene polymers (A) used in the present invention may include propylene copolymers and propylene homopolymers with propylene homopolymers being preferred. The copolymers of propylene may contain a small amount of ethylene and/or $C_4$-$C_{20}$ α-olefin such as 1-butene, 1-pentene, 4-methyl-1-pentene, 1-hexene, 1-octene, 1-decene, 1-dodecene, 1-tetradecene, 1-hexadecene, 1-octadecene, and 1-eicocene. These olefins may be used alone or in combination of two or more.

As the propylene homopolymer, preferred is a propylene homopolymer (A-1) satisfying (1) and (2):

(1) a meso pentad fraction [mmmm] of from 20 to 80 mol %; and (2) a racemic pentad fraction [rrrr] satisfying, together with 1−[mmmm], the following formula:

$$[rrrr]/(1-[mmmm]) \leq 0.1.$$

The molecular weight distribution (Mw/Mn) of the propylene homopolymer (A-1) is preferably 1.5 to 4.0, more preferably 1.5 to 3.5, most preferably 1.5 to 3.0, as measured by gel permeation chromatography (GPC).

The meso pentad fraction [mmmm] described herein means a meso fraction in pentad units in polypropylene molecular chain as measured using methyl signals in $^{13}$C-NMR spectra according to the method proposed by A. Zambelli et al., "Macromolecules", 6, 925 (1973). The larger value of the meso pentad fraction means a higher stereoregularity. The meso pentad fraction [mmmm] of the propylene homopolymer (A-1) used in the present invention is preferably 30 to 80 mol %. When the meso pentad fraction [mmmm] is less than 20 mol %, the polymer tends to be deteriorated in the tensile modulus and the impact resistance due to lowered crystallinity and has a poor processability. When the meso pentad fraction [mmmm] exceeds 80 mol %, the softness is lost and the low-temperature heat sealability is impaired because of increased high heat seal temperature. The racemic pentad fraction [rrrr] means a racemic fraction in pentad units in polypropylene molecular chain. The value of [rrrr]/(1−[mmmm]) is determined from the above fractions in pentad units, and is an index indicating uniformity of the regularity distribution of the propylene homopolymer (A-1). When the value becomes lager, the regularity distribution is broadened to give a polymer comprising a mixture of a high-stereoregular polypropylene and an amorphous polypropylene as in the case of a conventional polypropylene produced in the presence of a known catalyst system, thereby causing a film to have an increased tackiness and a reduced transparency. The value of [rrrr]/(1−[mmmm]) of the propylene homopolymer (A-1) used in the present invention is preferably 0.08 or less, more preferably 0.06 or less, most preferably 0.04 or less. When the value of [rrrr]/(1−[mmmm]) exceeds 0.1, the polymer tends to become sticky. The measuring method by $^{13}$C-NMR spectra is described in detail in Examples below.

In general, the polymerization of propylene usually proceeds by so-called 1,2-insertion in which the carbon atom located on the methylene side of a propylene monomer is bonded to the active site of a catalyst and propylene monomers are sequentially coordinated in the same manner to cause polymerization. However, 2,1-insertion or 1,3-insertion (abnormal insertion) rarely occurs. In the propylene homopolymer (A-1) used in the present invention, it is preferred that the 2,1-insertion or 1,3-insertion is minimized. Further, the ratio of these insertions is preferred to satisfy the relationship represented by the following formula (1):

$$[(m\text{-}2,1)+(r\text{-}2,1)+(1,3)] \leq 5.0(\%) \quad (1)$$

wherein (m-2,1) is a content (%) of meso 2,1-insertion as measured by $^{13}$C-NMR; (r-2,1) is a content (%) of racemic 2,1-insertion as measured by $^{13}$C-NMR; and (1,3) is a content (%) of 1,3-insertion as measured by $^{13}$C-NMR, more preferably by the following formula (2):

$$[(m\text{-}2,1)+(r\text{-}2,1)+(1,3)] \leq 1.0(\%) \quad (2), \text{ and}$$

most preferably by the following formula (3):

$$[(m\text{-}2,1)+(r\text{-}2,1)+(1,3)] \leq 0.1(\%) \quad (3).$$

A polymer not satisfying the formula (1) may, in some cases, be deteriorated in crystallinity more than expected to cause tackiness.

The insertion contents (m-2,1), (r-2,1) and (1,3) are calculated from integral intensities of respective peaks of $^{13}$C-NMR spectra which are assigned to the respective insertions according to the method reported in Grassi, et al., "Macromolecules", 21, p. 617 (1988) and Busico, et al., "Macromolecules", 27, p. 7538 (1994). Namely, (m-2,1) is a meso 2,1-insertion content (%) calculated from a ratio of the integral intensity of the Pα,γ threo peak at around 17.2 ppm to the integral intensity of a whole methyl carbon region. The content (r-2,1) is a racemic 2,1-insertion content (%) calculated from a ratio of the integral intensity of the Pα,γ threo peak at around 15.0 ppm to the integral intensity of a whole methyl carbon region. The content (1,3) is a 1,3-insertion content (%) calculated from a ratio of the integral intensity of the Tβ,γ+ peak at around 31.0 ppm to the integral intensity of a whole methyl carbon region.

Further, it is more preferred that the propylene homopolymer (A-1) used in the present invention shows substantially no peak attributable to a molecular chain end derived from the 2,1-insertion (n-butyl) when measured by $^{13}$C-NMR. With respect to the molecular chain end that is derived from the 2,1-insertion, the respective insertion contents are calculated from the integral intensities of peaks of $^{13}$C-NMR spectra which are assigned to the respective insertions according to the method reported in Jungling, et al., "J. Polym. Sci.: Part A: Polym. Chem.", 33, p. 1305 (1995). In case of isotactic polypropylene, the peak appearing near 18.9 ppm is assigned to the end methyl carbon of butyl. $^{13}$C-NMR measurement for determining the abnormal insertion and the molecular chain end is conducted in the same manner as in the measurement of the meso pentad fraction [mmmm] described above.

(I-2) Production of Propylene Polymer (A)

The propylene polymer (A) used in the present invention is preferably produced by polymerizing propylene, or polymerizing propylene with ethylene and/or $C_4$-$C_{20}$ α-olefin, in the presence of the following polymerization catalyst.

(I-2a) Polymerization Catalyst

The polymerization catalyst comprise:

(A) a transition metal compound represented by the following general formula (I):

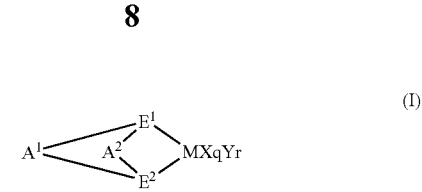

wherein M is a metal element of Groups 3 to 10 or lanthanum series of the Period Table;

$E^1$ and $E^2$ are the same or different and each independently is a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group; and $E^1$ and $E^2$ are cross-linked via $A^1$ and $A^2$;

X is a σ-bonding ligand; and a plurality of X, if any, may be same or different and each X may be cross-linked with another X, $E^1$, $E^2$ or Y;

Y is a Lewis base; and a plurality of Y, if any, may be same or different and each Y may be cross-linked with another Y, $E^1$, $E^2$ or X;

$A^1$ and $A^2$ may be the same or different divalent group for cross-linking two ligands $E^1$ and $E^2$ and each independently is $C_1$-$C_{20}$ hydrocarbyl, $C_1$-$C_{20}$ halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR— wherein R is hydrogen, halogen, $C_1$-$C_{20}$ hydrocarbyl or $C_1$-$C_{20}$ halogen-containing hydrocarbyl;

q is an integer of 1 to 5 given by the formula, [(valence of M)–2]; and r is an integer of 0 to 3, and (B) at least one component selected from the group consisting of a compound (B-1) capable of forming an ionic complex by reacting with said transition metal compound (A) or a derivative thereof, and an aluminoxane (B-2).

In the above general formula (I), M represents a metal element belonging to Groups 3 to 10 or lanthanum series of the Period Table. Specific examples of the metal elements include titanium, zirconium, hafnium, yttrium, vanadium, chromium, manganese, nickel, cobalt, palladium and lanthanoid metals. Of these metal elements, preferred are titanium, zirconium and hafnium in view of the activity to olefin polymerization.

$E^1$ and $E^2$ form a cross-linked structure via $A^1$ and $A^2$ and each independently is a ligand selected from the group consisting of substituted cyclopentadienyl, indenyl, substituted indenyl, heterocyclopentadienyl, substituted heterocyclopentadienyl, amido (—N<), phosphide (—P<), π-bonding hydrocarbyl (>CR$^{12}$—, >C<) and silicon-containing group (>SiR$^{12}$—, >Si<) wherein R$^{12}$ is hydrogen, $C_1$-$C_{20}$ hydrocarbyl or hetero atom-containing group. Examples of π-bonding hydrocarbyl (>CR$^{12}$—, >C<) include pentadienyl and boratabenzenyl. Examples of silicon-containing group (>SiR$^{12}$—, >Si<) include —CH$_2$—Si(CH$_3$)< and —Si(CH$_3$)<. The ligands $E^1$ and $E^2$ may be same or different from each other. Of these ligands, preferred are substituted cyclopentadienyl, indenyl and substituted indenyl.

X represents a σ-bonding ligand. A plurality of X, if any, may be same or different, and may be cross-linked with another X, $E^1$, $E^2$ or Y. Examples of the ligand X include halogen, $C_1$-$C_{20}$ hydrocarbyl, $C_1$-$C_{20}$ alkoxy, $C_6$-$C_{20}$ aryloxy, a $C_1$-$C_{20}$ amide, $C_1$-$C_{20}$ silicon-containing group, $C_1$-$C_{20}$ phosphide, a $C_1$-$C_{20}$ sulfide, $C_1$-$C_{20}$ sulfoxide and $C_1$-$C_{20}$ acyl.

Examples of halogen include chlorine, fluorine, bromine and iodine. Examples of $C_1$-$C_{20}$ hydrocarbyl include alkyl such as methyl, ethyl, propyl, butyl, hexyl, cyclohexyl and octyl; alkenyl such as vinyl, propenyl and cyclohexenyl; arylalkyl such as benzyl, phenylethyl and phenylpropyl; and aryl such as phenyl, tolyl, dimethylphenyl, trimethylphenyl, ethylphenyl, propylphenyl, biphenyl, naphthyl, methylnaphthyl, anthracenyl and phenathryl. Of the above, preferred are alkyl such as methyl, ethyl and propyl, and aryl such as phenyl. Examples of $C_1$-$C_{20}$ alkoxy include methoxy, ethoxy, propoxy, butoxy, phenylmethoxy and phenylethoxy. Examples of $C_6$-$C_{20}$ aryloxy include phenoxy, methylphenoxy and dimethylphenoxy. Examples of $C_1$-$C_{20}$ amido include alkylamido such as dimethylamido, diethylamido, dipropylamido, dibutylamido, dicyclohexylamido and methylethylamido; arylalkylamido such as dibenzylamido, phenylehtylamido and phenylpropylamido; alkenylamido such as divinylamido, dipropenylamido and dicyclohexenylamido; arylalkylamido such as dibenzylamido, phenylethylamido and phenylpropylamido; and arylamido such as diphenylamido and dinaphthylamido. Examples of $C_1$-$C_{20}$ silicon-containing group include monohydrocarbylsilyl such as methylsilyl and phenylsilyl; dihydrocarbylsilyl such as dimethylsilyl and diphenylsilyl; trihydrocarbylsilyl such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; hydrocarbylsilyl ether such as trimethylsilyl ether; silicon-substituted alkyl such as trimethylsilylmethyl; and silicon-substituted aryl such as trimethylsilylphenyl. Examples of $C_1$-$C_{20}$ phosphide include alkylphosphide such as methylphosphide, ethylphosphide, propylphosphide, butylphosphide, cyclohexylphosphide, hexylphosphide and octylphosphide; alkenylphosphide such as vinylphosphide, benzylphosphide and propenylphosphide; and aryl phosphide such as phenylphosphide. Examples of $C_1$-$C_{20}$ sulfide include alkylsulfide such as methylsulfide, ethylsulfide, propylsulfide, butylsulfide, hexylsullfide, cyclohexylsulfiede and octylsulfide; alkenylsulfide such as vinylsulfide, propenylsulfide and cyclohexenylsulfide; arylalkylsulfide such as benzylsulfide, phenylethylsulfide and phenylpropylsulfide; and arylsulfide such as phenylsulfide, tolylsulfide, dimethylphenylsulfide, trimethylphenylsulfide, ethylphenylsulfide, propylphenylsulfide, biphenylsulfide, naphthylsulfide, methylnaphthylsulfide, anthracenylsulfide and phenanthrylsulfide. Examples of $C_1$-$C_{20}$ sulfoxide include alkylsulfoxide such as methylsulfoxide, ethylsulfoxide, propylsulfoxide, butylsulfoxide, hexylsulfoxide, cyclohexysulfoxide and octylsulfoxide; alkenylsulfoxide such as vinylsulfoxide, propenylsulfoxide and cyclohexenylsulfoxide; arylalkylsulfoxide such as benzylsulfoxide, phenylethylsulfoxide and phenylpropylsulfoxide; and arylsulfoxide such as phenylsulfoxide, tolylsulfoxide, dimethylphenylsulfoxide, trimethylphenylsulfoxide, ethylphenylsulfoxide, propylphenylsulfoxide, biphenylsulfoxide, naphthylsulfoxide, methylnaphthylsulfoxide, anthracenylsulfoxide and phenathrylsulfoxide. Examples of $C_1$-$C_{20}$ acyl include alkylacyl such as formyl, acetyl, propionyl, butyryl, valeryl, palmitoyl, stearoyl and oleyl; arylacyl such as benzoyl, toluoyl, salicyloyl, cinnamoyl, naphthoyl and phthaloyl; and oxalyl, malonyl and succinyl derived from dicarboxylic acids such as oxalic acid, malonic acid and succinic acid.

Y represents a Lewis base. A plurality of Y, if nay, may be the same or different, and may be cross-linked with another Y, $E^1$, $E^2$ or X. The Lewis base may be amine, ether, phosphine and thioether. The amine may be $C_1$-$C_{20}$ amine exemplified by alkylamines such as methylamine, ethylamine, propylamine, butylamine, cyclohexylamine, methylethylamine, dimethylamine, diethylamine, dipropylamine, dibutylamine, dicyclohexylamine and methylethylamine; alkenylamines such as vinylamine, propenylamine, cyclohexenylamine, divinylamine, dipropenylamine and dicyclohexenylamine; arylalkylamines such as phenylmethylamine, phenylethylamine and phenylpropylamine; and arylamines such as diphenylamine and dinaphthylamine. Examples of the ethers include aliphatic simple ethers such as methyl ether, ethyl ether, propyl ether, isopropyl ether, butyl ether, isobutyl ether, n-amyl ether and isoamyl ether; aliphatic mixed ethers such as methyl ethyl ether, methyl propyl ether, methyl isopropyl ether, methyl n-amyl ether, methyl isoamyl ether, ethyl propyl ether, ethyl isopropyl ether, ethyl butyl ether, ethyl isobutyl ether, ethyl n-amyl ether and ethyl isoamyl ether; aliphatic unsaturated ethers such as vinyl ether, allyl ether, methyl vinyl ether, methyl allyl ether, ethyl vinyl ether and ethyl allyl ether; aromatic ethers such as anisole, phenetole, phenyl ether, benzyl ether, phenyl benzyl ether, α-naphthyl ether and β-naphthyl ether; and cyclic ethers such as ethylene oxide, propylene oxide, trimethylene oxide, tetrahydrofuran, and dioxane. The phosphines may be $C_1$-$C_{20}$ (cyclo)alkylphosphines, alkenylphosphines, (arylalkyl)phosphines, arylalkylphosphines and aromatic phosphines. Examples of (cyclo)alkylphosphines include mono(cyclo)alkylphosphines such as methylphosphine, ethylphosphine, propylphosphine, butylphosphine, hexylphosphine, cyclohexylphosphine and octylphosphine; di(cyclo)alkylphosphines such as dimethylphosphine, diethylphosphine, dipropylphosphine, dibutylphosphine, dihexylphosphine, dicyclohexylphosphine and dioctylphosphine; and tri(cyclo)alkylphosphines such as trimethylphosphine, triethylphosphine, tripropylphosphine, tributylphosphine, trihexylphosphine, tricyclohexylphosphine and trioctylphosphine. Examples of alkenylphosphines include monoalkenylphosphines such as vinyl phosphine, propenyl phosphine and cyclohexenyl phosphine; dialkenylphosphines in which two hydrogen atoms of phosphine are replaced by alkenyl groups; and trialkenylphosphines in which three hydrogen atoms of phosphine are replaced by alkenyl groups. Examples of (arylalkyl)phosphines include benzylphosphine, (phenylethyl)phosphine and (phenylpropyl)phosphine. Examples of arylalkylphosphines include diarylalkylphosphine and aryldialkylphosphine in which three hydrogen atoms of phosphine are replaced by three of aryl and alkyl. Examples of aromaticphosphines include arylphosphines such as phenylphosphine, tolylphosphine, dimethylphenylphosphine, trimethylphenylphosphine, ethylphenylphosphine, propylphenylphosphine, biphenylphosphine, naphthylphosphine, methylnaphthylphosphine, anthracenyl phosphine and phenathryl phosphine; di(alkylaryl)phosphines in which two hydrogen atoms of phosphine are replaced by alkylaryl groups; and tri(alkylaryl)phosphines in which three hydrogen atoms of phosphine are replaced by alkylaryl groups. As thioethers, the sulfides mentioned above for X may be used.

$A^1$ and $A^2$ are divalent groups for cross-linking two ligands, and may be the same or different from each other. $A^1$ and $A^2$ are each independently $C_1$-$C_{20}$ hydrocarbyl, $C_1$-$C_{20}$ halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR— wherein R is hydrogen, halogen, $C_1$-$C_{20}$ hydrocarbyl or $C_1$-$C_{20}$ halogen-containing hydrocarbyl. At least one of $A^1$ and $A^2$ is preferably a hydrocarbon group containing one or more carbons. Examples of the cross-linking groups include ethylene, 1,2-cyclohexylene, dimethylsilylene, diphenylsilylene, methylphenylsilylene, dimethylgermylene, dimethylstannylene, tetramethyldisilylene, diphenyldisilylene and divalent groups represented by the following general formula:

wherein $R^{13}$ and $R^{14}$ may be same or different and each independently is hydrogen or $C_1$-$C_{20}$ hydrocarbyl; $R^{13}$ and $R^{14}$ may be bonded to each other to form a ring; and e is an integer of 1 to 4. Examples of the cross-linking groups represented by the above formula include methylene, ethylidene, propylidene, isopropylidene, cyclohexylidene and vinylidene ($CH_2$=$C$=). Of these cross-linking groups, preferred are ethylene, isopropylidene and dimethylsilylene.

The suffix q is an integer of 1 to 5 given by the formula, [(valence of M)−2], and the suffix r is an integer of 0 to 3.

In the transition metal compounds represented by the general formula (I), when $E^1$ and $E^2$ are substituted cyclopentadienyl, indenyl or substituted indenyl, the cross-linking groups $A^1$ and $A^2$ preferably form (1,2') (2,1') double bridge. Of the transition metal compounds of the general formula (I) having such a structure, preferred are those having, as a ligand, a doubly bridged biscyclopentadienyl derivative represented by the following formula (I-a):

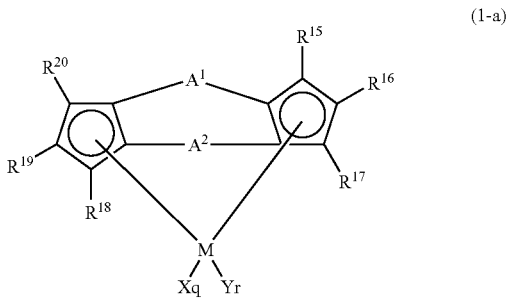

In the formula (I-a), M, $A^1$, $A^2$, q and r are the same as defined above. X is a σ-bonding ligand, and a plurality of X, if any, may be the same or different and may be cross-linked with another X group or Y. Examples of X are the same as exemplified above with respect to X of the general formula (I). Y is a Lewis base, and a plurality of Y, if any, may be the same or different and may be cross-linked with another Y or X. Examples of Y are the same as exemplified above with respect to Y of the general formula (I). $R^{15}$ to $R^{20}$ are each independently hydrogen, halogen, $C_1$-$C_{20}$ hydrocarbyl, $C_1$-$C_{20}$ halogen-containing hydrocarbyl, silicon-containing group or hetero atom-containing group, with the proviso that, at least one of $R^{15}$ to $R^{20}$ is required to be other than hydrogen. $R^{15}$ to $R^{20}$ may be the same or different, and adjacent pair may be bonded to each other to form a ring. In particular, $R^{16}$ and $R^{17}$ as well as $R^{19}$ and $R^{20}$ are preferably bonded to each other to form a ring. More preferably, each pair forms indenyl group together with cyclopentadienyl to which each pair is attached. $R^{15}$ and $R^{18}$ are each preferably a group having a hetero atom such as oxygen, halogen and silicon, because the polymerization activity is enhanced.

The doubly bridged biscyclopentadienyl ligand of the transition metal compound is preferred to be (1,2') (2,1') double bridge.

Examples of the transition metal compounds represented by the general formula (I) include (1,2'-ethylene)(2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene)-bis(3-methylindenyl)zirconium dichloride, (1,2'-ethylene)(2,1'-ethylene)-bis(4,5-benzoindenyl)zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)zirconium dichloride, (1,2'-ethylene)(2,1'-ethylene)-bis(4,7-diisopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl) zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)-bis(indenyl)zirconium dichloride, (1,2'-dimethylsilylene)(2,1'-dimethylsilylene)-bis(3-methylindenyl) zirconium dichloride, (1,2'-dimethylsilylene)(2,1'-dimethylsilylene)-bis(3-n-butylindenyl)zirconium dichloride, (1,2'-dimethylsilylene)(2,1'-dimethylsilylene)-bis(3-isopropylindenyl)zirconium dichloride, (1,2'-dimethylsilylene) (2,1'-dimethylsilylene)-bis(3-trimethylsilylmethylindenyl)zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-diisopropylindenyl)zirconium dichloride, (1,2'-dimethylsilylene)(2,1'-dimethylsilylene)-bis(4-phenylindenyl) zirconium dichloride, (1,2'-dimethylsilylene)(2,1'-dimethylsilylene)-bis(3-methyl-4-isopropylindenyl) zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis (indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-isopropylindenyl)zirconium dichloride, (1,2'-dimethylsilylene)(2,1'-isopropylidene)-bis(3-n-butylindenyl)zirconium dichloride, (1,2'-dimethylsilylene)(2,1'-isopropylidene)-bis(3-trimethylsilylmethylindenyl)zirconium dichloride, (1,2'-dimethylsilylene)(2,1'-isopropylidene)-bis(3-trimethylsilylindenyl) zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis (3-methylindenyl)zirconium dichloride, (1,2'-dimethylsilylene)(2,1'-methylene)-bis(3-isopropylindenyl)zirconium dichloride, (1,2'-dimethylsilylene)(2,1'-methylene)-bis(3-n-butylindenyl)zirconium dichloride, (1,2'-dimethylsilylene) (2,1'-methylene)-bis(3-trimethylsilylmethylindenyl)zirconium dichloride, (1,2'-dimethylsilylene)(2,1'-methylene)-bis (3-trimethylsilylindenyl)zirconium dichloride, (1,2'-diphenylsilylene)(2,1'-methylene)-bis(indenyl)zirconium dichloride, (1,2'-diphenylsilylene)(2,1'-methylene)-bis(3-methylindenyl)zirconium dichloride, (1,2'-diphenylsilylene) (2,1'-methylene)-bis(3-isopropylindenyl)zirconium dichloride, (1,2'-diphenylsilylene)(2,1'-methylene)-bis(3-n-butylindenyl)zirconium dichloride, (1,2'-diphenylsilylene)

(2,1'-methylene)-bis(3-trimethylsilylmethylindenyl)zirconium dichloride, (1,2'-diphenylsilylene)(2,1'-methylene)-bis(3-trimethylsilylindenyl)zirconium dichloride, (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)(3',4'-dimethylcyclopentadienyl)zirconium dichloride, (1,2'-dimethylsilylene)(2,1'-isopropylidene)(3,4-dimethylcyclopentadienyl)(3',4'-dimethylcyclopentadienyl)zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene)(3,4-dimethylcyclopentadienyl)(3',4'-dimethylcyclopentadienyl)zirconium dichloride, (1,2'-mehylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-isopropylcyclopentadienyl)(3'-methyl-5'-isopropylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-isopropylcyclopentadienyl)(3'-methyl-5'-isopropylcyclopentadienyl)zirconium dichloride, (1,2'-dimethylsilylene)(2,1'-ethylene)(3-methyl-5-n-butylcyclopentadienyl)(3'-methyl-5'-n-butylcyclopentadienyl)zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-isopropylcyclopentadienyl)(3'-methyl-5'-isopropylcyclopentadienyl)zirconium dichloride, (1,2'-dimethylsilylene)(2,1'-methylene)(3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-isopropylcyclopentadienyl)(3'-methyl-5'-isopropylcyclopentadienyl)zirconium dichloride, (1,2'-ethylene)(2,1'-isopropylidene)(3-methyl-5-isopropylcyclopentadienyl)(3'-methyl-5'-isopropylcyclopentadienyl)zirconium dichloride, (1,2'-methylene)(2,1'-methylene)(3-methyl-5-isopropylcyclopentadienyl)(3'-methyl-5'-isopropylcyclopentadienyl)zirconium dichloride, (1,2'-methylene)(2,1'-isopropylidene)(3-methyl-5-isopropylcyclopentadienyl)(3'-methyl-5'-isopropylcyclopentadienyl)zirconium dichloride, and compounds obtained by replacing zirconium of the above-described compounds with titanium or hafnium, though not limited thereto. Further, similar compounds containing metal elements belonging to the other Groups or lanthanum series may also be involved in the present invention.

As the component (B-1), any compounds can be used as long as they form ionic complex by reacting with the above transition metal compound (A). Suitable compounds are represented by the following general formulae (III) or (IV):

$$([L^1\text{-}R^{21}]^{k+})_a([Z]^-)_b \tag{III}$$

$$([L^2]^{k+})_a([Z]^-)_b \tag{IV}$$

In the formulae (III) and (IV), $L^1$ represents a Lewis base. $[Z]^-$ represents a non-coordinating anion $[Z^1]^-$ or $[Z^2]^-$. $[Z^1]^-$ is an anion comprising an element and a plurality of groups bonded to the element, i.e., $[M^4G^1G^2 \ldots G^f]^-$ wherein $M^4$ is an element belonging to Groups 5 to 15, preferably Groups 13 to 15 of the Periodic Table; $G^1$ to $G^f$ are each hydrogen, halogen, $C_1$-$C_{20}$ alkyl, $C_2$-$C_{40}$ dialkylamino, $C_1$-$C_{20}$ alkoxy, $C_6$-$C_{20}$ aryl, $C_6$-$C_{20}$ aryloxy, $C_7$-$C_{40}$ alkylaryl, $C_7$-$C_{40}$ arylalkyl, $C_1$-$C_{20}$ halogen-substituted hydrocarbyl, $C_1$-$C_{20}$ acylalkoxy, organometalloid or $C_2$-$C_{20}$ hetero atom-containing hydrocarbyl, and two or more of $G^1$ to $G^f$ may be bonded to each other to form a ring; f is an integer given by the formula, [(valence of central metal $M^4$)+1]. $[Z^2]^-$ is a conjugated base of Brønsted acid having a logarithm of reciprocal of acid dissociation constant (pKa) of −10 or lower, a conjugated base of a combination of the Brønsted acid and a Lewis acid, or a conjugated base of an acid generally defined as superstrong acid, and may be coordinated with a Lewis base.

$R^{21}$ is hydrogen, $C_1$-$C_{20}$ alkyl, $C_6$-$C_{20}$ aryl, $C_6$-$C_{20}$ alkylaryl or $C_6$-$C_{20}$ arylalkyl.

$L^2$ is $M^2$, $R^{22}R^{23}M^3$, $R^{24}{}_3C$ or $R^{25}M^3$ wherein $R^{22}$ and $R^{23}$ are each cyclopentadienyl, substituted cyclopentadienyl, indenyl or fluorenyl; $R^{24}$ is $C_1$-$C_{20}$ alkyl, aryl, alkylaryl or arylalkyl; $R^{25}$ is a macrocyclic ligand such as tetraphenylporphyrin and phthalocyanine; $M^2$ is an element belonging to Groups 1 to 3, 11 to 13 and 17 of the Periodic Table; and $M^3$ is an element belonging to Groups 7 to 12 of the Periodic Table.

Superscript k represents an ionic valence of $[L^1-R^{21}]$ or $[L^2]$, i.e., an integer of 1 to 3.

Subscript a is an integer of 1 or more satisfying b=k×a.

Examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylamine and p-nitro-N,N-dimethylaniline; phosphines such as triethylphosphine, triphenylphosphine and diphenylphosphine; thioethers such as tetrahydrothiophene; esters such as ethyl benzoate; and nitriles such as acetonitrile and benzonitrile.

Examples of $R^{21}$ include hydrogen, methyl, ethyl, benzyl, and trityl. Examples of $R^{22}$ and $R^{23}$ include cyclopentadienyl, methylcyclopentadienyl, ethylcyclopentadienyl, and pentamethylcyclopentadienyl. Examples of $R^{24}$ include phenyl, p-tolyl, and p-methoxyphenyl. Examples of $R^{25}$ include tetraphenylporphyrin, phthalocyanine, allyl, and methallyl. Examples of $M^2$ include Li, Na, K, Ag, Cu, Br, I, and $I_3$. Examples of $M^3$ include Mn, Fe, Co, Ni, and Zn.

In $[Z^1]^-$, i.e., $[M^4G^1G^2 \ldots G^f]^-$, examples of $M^4$ include B, Al, Si, P, As, and Sb with B and Al being preferred. Examples of $G^1$ to $G^f$ include dialkylamino such as dimethylamino and diethylamino; alkoxy or aryloxy such as methoxy, ethoxy, n-butoxy and phenoxy; hydrocarbyl such as methyl, ethyl, n-propyl, isopropyl, n-butyl, isobutyl, n-octyl, n-eicosyl, phenyl, p-tolyl, benzyl, 4-t-butylphenyl and 3,5-dimethylphenyl; halogen such as fluorine, chlorine, bromine and iodine; hetero atom-containing hydrocarbyl such as p-fluorophenyl, 3,5-difluorophenyl, pentachlorophenyl, 3,4,5-trifluorophenyl, pentafluorophenyl, 3,5-bis(trifluoromethyl)phenyl and bis(trimethylsilyl)methyl; and organometalloid such as pentamethylantimony, trimethylsilyl, trimethylgermyl, diphenylarsine, dicyclohexylantimony and diphenylboron.

Examples of the non-coordinating anion, i.e., the conjugated base $[Z^2]^-$ of Brønsted acid having a pKa of −10 or lower or the conjugated base of a combination of the Brønsted acid and a Lewis acid include trifluoromethanesulfonic acid anion $[(CF_3SO_3)^-]$, bis(trifluoromethanesulfonyl)methyl anion, bis(trifluoromethanesulfonyl)benzyl anion, bis(trifluoromethanesulfonyl)amide, perchloric acid anion $[(ClO_4)^-]$, trifluoroacetic acid anion $[(CF_3CO_2)^-]$, hexafluoroantimony anion $[(SbF_6)^-]$, fluorosulfonic acid anion $[(FSO_3)^-]$, chlorosulfonic acid anion $[(ClSO_3)^-]$, fluorosulfonic acid anion/antimony pentafluoride $[(FSO_3/SbF_5)^-]$, fluorosulfonic acid anion/arsenic pentafluoride $[(FSO_3/AsF_5)^-]$, and trifluoromethanesulfonic acid anion/antimony pentafluoride $[(CF_3SO_3/SbF_5)^-]$.

Examples of the ionic compound (B-1) capable of forming an ionic complex by reacting with the transition metal compound (A) include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-di-trifluoromethyl)phenyl]borate, ferrocenium tetraphenylborate, silver tetraphenylborate, trityl tetraphenylborate, tetraphenylporphyrin manganese tetraphenylborate, ferrocenium tetrakis (pentafluorophenyl)borate, (1.1'-dimethylferrocenium)tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrin manganese tetrakis(pentafluorophenyl)borate, silver tetrafluoroborate, silver hexafluorophosphate, silver hexafluoroarsenate, silver perchlorate, silver trifluoroacetate, and silver trifluoromethanesulfonate.

These ionic compounds (B-1) which are capable of forming an ionic complex by reacting with the transition metal compound (A) may be used alone or in combination of two or more.

The aluminoxane (B-2) may be a linear aluminoxane represented by the following general formula (V):

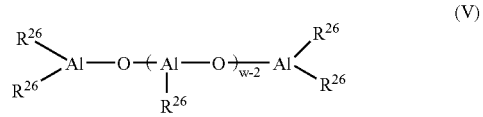

wherein $R^{26}$ is $C_1$-$C_{20}$, preferably $C_1$-$C_{12}$ hydrocarbyl such as alkyl, alkenyl, aryl and arylalkyl or halogen; w is an average polymerization degree, i.e., an integer of usually 2 to 50, preferably 2 to 40; and $R^{26}$ groups may be the same or different, or a cyclic aluminoxane represented by the following general formula (VI):

wherein $R^{26}$ and w are the same as defined above.

The above aluminoxanes may be produced by contacting an alkyl aluminum with a condensing agent such as water. The contact method is not particularly restricted, and may be conducted by any known methods. For example, there may be used:

(1) a method of dissolving an organoaluminum compound in an organic solvent, and then contacting the solution with water;

(2) a method of adding an organoaluminum compound at an initial stage of polymerization, and then adding water at a later stage of polymerization;

(3) a method of reacting crystal water of a metal salt or adsorbed water of an inorganic or organic compound with an organoaluminum compound; and (4) a method of reacting tetraalkyldialuminoxane with an trialkylaluminum, and then with water. The aluminoxanes may be insoluble to toluene. These aluminoxanes may be used alone or in combination of two or more.

When using the compound (B-1) as the catalyst component (B), the molar ratio of the catalyst component (A) to the catalyst component (B) is preferably 10:1 to 1:100, more preferably 2:1 to 1:10. When out of the above range, the cost performance of the catalyst per unit weight of the polymer is low and therefore not practical. When using the compound (B-2) as the catalyst component (B), the molar ratio of the catalyst component (A) to the catalyst component (B) is preferably 1:1 to 1:1,000,000, more preferably 1:10 to 1:10,000. When out of the above range, the cost performance of the catalyst per unit weight of the polymer is low and therefore not practical. The compounds (B-1) and (B-2) may be used alone or in combination.

The polymerization catalyst used in the present invention may further contain, in addition to the components (A) and (B), an organoaluminum compound as the component (C).

The organoaluminum compound (C) usable in the present invention is represented by the general formula (VII):

$$R^{27}{}_v AlJ_{3-v} \qquad (VII)$$

wherein $R^{27}$ is $C_1$-$C_{10}$ alkyl; J is hydrogen, $C_1$-$C_{20}$ alkoxy, $C_6$-$C_{20}$ aryl or halogen; v is an integer of 1 to 3.

Examples of the compounds represented by the general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride. These organoaluminum compounds may be used alone or in combination of two or more.

In the production method of the present invention, the components (A), (B) and (C) may be preliminarily contacted with each other. The preliminary contact may be performed, for example, by contacting the component (B) with the component (A). The contacting method is not particularly restricted and may be conducted by any known method. The preliminary contact is effective to reduce the catalyst cost because the catalytic activity is improved and the use amount of the co-catalyst component (B) is reduced. By contacting the component (A) with the compound (B-2), an effect, in addition to the above effect, of increasing the molecular weight can be obtained. The preliminary contact is usually carried out at −20 to 200° C., preferably −10 to 150° C., more preferably 0 to 80° C. optionally using a solvent such as inert hydrocarbons, aliphatic hydrocarbons and aromatic hydrocarbons with the aliphatic hydrocarbons being preferred.

The molar ratio of the catalyst component (A) to the catalyst component (C) is preferably 1:1 to 1:10,000, more preferably 1:5 to 1:2,000, still more preferably 1:10 to 1:1,000. The component (C) increases the polymerization activity per unit transition metal. However, an excessively large amount is useless and a large amount of the component (C) remains in the polymer.

In the present invention, at least one of the catalyst components may be carried on a suitable support. The catalyst support usable in the present invention may be, but not limited to, inorganic oxide supports, other inorganic supports and organic supports with the inorganic oxide supports and other inorganic supports being preferred.

Examples of inorganic oxides for the catalyst support include $SiO_2$, $Al_2O_3$, MgO, $ZrO_2$, TiO2, $Fe_2O_3$, $B_2O_3$, CaO, ZnO, BaO, $ThO_2$ and mixtures thereof such as silica alumina, zeolite, ferrite and glass fibers with $SiO_2$ and $Al_2O_3$ being particularly preferred. The inorganic oxide supports may contain a small amount of carbonates, nitrates, sulfates, etc.

As the other support, usable is a magnesium compound or its complex salt, such as $MgCl_2$ and $Mg(OC_2H_5)_2$, represented by the general formula:

$$MgR^{28}{}_x X^1{}_y$$

wherein $R^{28}$ is $C_1$-$C_{20}$ alkyl, $C_1$-$C_{20}$ alkoxy or $C_6$-$C_{20}$ aryl; $X^1$ is a halogen atom or $C_1$-$C_{20}$ alkyl; x is an integer of 0 to 2, and y is an integer of 0 to 2 with x+y being 2. $R^{28}$ groups or $X^1$ groups may be the same or different, respectively.

Examples of the organic supports include polymers such as polystyrene, styrene-divinylbenzene copolymer, polyethylene, polypropylene, substituted polystyrene and polyarylate, starch, and carbon.

Of the above catalyst supports, preferred are $MgCl_2$, $MgCl(OC_2H_5)$, $Mg(OC_2H_5)_2$, $SiO_2$ and $Al_2O_3$. Although depending upon the type and the production method, the average particle size of the catalyst support is usually 1 to 300 μm, preferably 10 to 200 μm, more preferably 20 to 100 μm. An excessively small particle size of the catalyst support leads to increase in the amount of fine powder in the polymer, and an excessively large particle size leads to increase in the amount of coarse particles in the polymer to reduce the bulk density of the polymer or clog a hopper.

The specific surface area of the catalyst support is usually 1 to 1,000 m²/g, preferably 50 to 500 m²/g, and the pore volume is usually 0.1 to 5 cm³/g, preferably 0.3 to 3 cm³/g.

When the specific surface area or the pore volume is out of the above range, the catalyst activity tends to be lowered. The specific surface area and the pore volume are determined, for example, from a volume of nitrogen gas absorbed according to BET method.

Further, the inorganic oxide support is preferably used after calcined usually at 150 to 1,000° C., preferably 200 to 800° C.

When supporting at least one catalyst component on the catalyst support, at least one, preferably both, of the catalyst components (A) and (B) may be supported thereon. Although the method for supporting at least one of the catalyst components (A) and (B) is not particularly limited, the supporting may be effected, for example, by:

(1) a method of mixing at least one of the components (A) and (B) with the catalyst support;

(2) a method of mixing a catalyst support treated with an organoaluminum compound or a halogen-containing silicon compound with at least one of the component (A) and (B) in an inert solvent;

(3) a method of reacting the catalyst support and the component (A) and/or the component (B) with an organoaluminum compound or a halogen-containing silicon compound;

(4) a method of mixing a catalyst support that supports one of the component (A) and the component (B) with the other component being not supported;

(5) a method of mixing a contact reaction product of the component (A) and the component (B) with the catalyst support; or (6) a method of contacting the component (A) with the component (B) in the presence of the catalyst support.

The methods (4), (5) and (6) may be carried out in the presence of the organoaluminum compound (C).

The catalyst of the present invention may be prepared by irradiating the components (A), (B) and (C) with an elastic wave during the contact treatment. The elastic wave may be a sound wave, preferably an ultrasonic wave having a frequency of 1 to 1,000 kHz, preferably 10 to 500 kHz.

The catalyst thus obtained may be used for the polymerization in as-produced state or in a solid state after distilling off the solvent.

Alternatively, in the present invention, the catalyst may be directly prepared in the polymerization system by supporting at least one of the component (A) and the component (B) on the catalyst support therein. For example, catalyst particles can be formed by placing at least one of the component (A) and the component (B), the catalyst support and an optional organoaluminum compound (component (C)) in a reactor, and then, pre-polymerizing an olefin such as ethylene at −20 to 200° C. for about one minute to about two hours under ordinary pressure to 2 MPa (Gauge).

The weight ratio of the compound (B-1) to the catalyst support is preferably 1:5 to 1:10,000, more preferably 1:10 to 1:500, and the weight ratio of the compound (B-2) to the catalyst support is preferably 1:0.5 to 1:1000, more preferably 1:1 to 1:50. When two or more kinds of the component (B) are used, the weight ratio of each component (B) to the catalyst support preferably lies within the above range. The weight ratio of the component (A) to the catalyst support is preferably 1:5 to 1:10,000, more preferably 1:10 to 1:500.

When the weight ratio of the component (B) (compound (B-1) or compound (B-2)) to the catalyst support or the weight ratio of the component (A) to the catalyst support is out of the above range, the catalytic activity tends to be lowered. The average particle size of the polymerization catalyst thus prepared is usually 2 to 200 µm, preferably 10 to 150 µm, more preferably 20 to 100 µm. The specific surface area is usually 20 to 1,000 $m^2/g$, preferably 50 to 500 $m^2/g$. When the average particle size is less than 2 µm, the amount of fine powder in the polymer tends to be increased. When the average particle size exceeds 200 µm, the amount of coarse particles in the polymer tends to be increased. When the specific surface area is less than 20 $m^2/g$, the catalytic activity tends to be lowered. When the specific surface area exceeds 1,000 $m^2/g$, the bulk density of the polymer tends to be lowered. The amount of the transition metal in the catalyst is usually 0.05 to 10 g, preferably 0, 1 to 2 g based on 100 g of the catalyst support. When out of the above range, the catalytic activity tends to be lowered.

The use of the supported catalyst enables the production of industrially useful polymers having an high bulk density and a desired particle size distribution.

(I-2b) Polymerization

The polymer (A) may be produced by any polymerization method of, but not particularly restricted, slurry polymerization, gas-phase polymerization, bulk polymerization, solution polymerization, and suspension polymerization with slurry polymerization and gas-phase polymerization being preferred. Examples of $C_4$-$C_{20}$ α-olefins include ethylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. These α-olefins may be used alone or in combination of two or more.

As to the polymerization conditions, the polymerization temperature is usually −100 to 250° C., preferably −50 to 200° C., more preferably 0 to 130° C. The molar ratio of the starting monomer or monomers to the component (A) is preferably 1 to $10^8$, more preferably 100 to $10^5$. The polymerization time is usually 5 min to 10 h, and the polymerization reaction pressure is preferably from ordinary pressure to 20 MPa (Gauge), more preferably from ordinary pressure to 10 MPa (Gauge).

The molecular weight of the polymer may be controlled by appropriately selecting kinds and amounts of the catalyst components and polymerization temperature, or by polymerizing in the presence of a chain transfer agent such as hydrogen; silane compounds such as phenylsilane and phenyldimethylsilane; and organoaluminum compounds such as trimethyl aluminum with hydrogen being preferred. The addition amount of the chain transfer agent is 10 mol or more, preferably 50 mol or more per one mol of the transition metal in the catalyst.

The polymerization may be carried out using a solvent, for example, aromatic hydrocarbons such as benzene, toluene, xylene and ethyl benzene; alicyclic hydrocarbons such as cyclopentane, cyclohexane and methylcyclohexane; aliphatic hydrocarbons such as pentane, hexane, heptane and octane; and halogenated hydrocarbons such as chloroform and dichloromethane. These solvent may be used alone or in combination of two or more. Also, the monomer such as α-olefins may be used as the solvent. In some polymerization methods, polymerization is performed in the absence of a solvent.

Prior to the main polymerization, a pre-polymerization may be conducted using the polymerization catalyst. The pre-polymerization can be carried out, for example, by contacting a small amount of olefins with the solid catalyst component. The contact method is not particularly restricted, and may be any known method. Olefins usable in the pre-polymerization are not particularly restricted, and the same olefins as exemplified above, e.g., ethylene, $C_3$-$C_{20}$ α-olefins or mixtures thereof may be used. The olefin used in the pre-polymerization is preferred to be the same as that to be used in the subsequent main polymerization.

The temperature of the pre-polymerization is usually from −20 to 200° C., preferably from −10 to 130° C., more preferably from 0 to 80° C. The pre-polymerization may be carried out using a solvent such as inert hydrocarbons, aliphatic hydrocarbons, aromatic hydrocarbons and monomers with aliphatic hydrocarbons being preferred. Alternatively, the pre-polymerization may be conducted in the absence of a solvent.

The pre-polymerization conditions are preferably controlled such that the resultant prepolymerization product has an intrinsic viscosity [η] of 0.2 dL/g or higher, preferably 0.5 dL/g or higher when measured at 135° C. in tetralin, and the yield thereof is 1 to 10,000 g, preferably 10 to 1,000 g per 1 mmol of the transition metal in the catalyst.

(I-3) Production of Polypropylene Film

The propylene polymer (A) and propylene homopolymer (A-1) are formed into films having a thickness of usually 1 to 10,000 µm by any suitable molding method of compression molding, extrusion, blow molding, casting, or the like. The film-forming conditions are easily determined by one of those skilled in the art. Films produced by a cast molding are preferred. The surface of film may be treated, if necessary, to increase the surface energy and polarize the surface. The treating method includes, for example, corona discharge treatment, chromic acid treatment, flame treatment, hot-air treatment, ozone irradiation, and ultraviolet irradiation. The surface of film may be roughened, for example, by sandblasting treatment, solvent treatment or the like.

The film may contain, if desired, a nucleating agent, an anti-oxidant, a neutralizer, a slipping agent, an anti-blocking agent, an anti-fogging agent, an anti-static agent, etc.

The nucleating agent is not particularly limited as far as it can accelerate the nucleation process. Examples of substances having such effect are those capable of facilitating the orientation of molecular chains through the adsorption of the molecular chains. The nucleating agents may be high-melting polymers, carboxylic acids or metal salts thereof, aromatic sulfonic acids or metal salts thereof, organophosphoric acids or metal salts thereof, dibenzylidenesorbitol or derivatives thereof, partial metal salts of rosin acids, inorganic fine particles, imides, amides, quinacridones, quinones, or mixtures thereof.

Examples of the high-melting polymers include polyolefins such as polyethylene and polypropylene; polyvinylcycloalkanes such as polyvinylcyclohexane and polyvinylcyclopentane; syndiotactic polystyrene; poly(3-methylpentene-1); poly(3-methylbutene-1); and polyalkenylsilanes. Examples of the metal salts include aluminum benzoate, aluminum p-tert-butylbenzoate, sodium adipate, sodium thiophenecarboxylate, and sodium pyrrolecarboxylate. Examples of the dibenzylidenesorbitol and its derivatives include dibenzylidenesorbitol, 1,3:2,4-bis(o-3,4-dimethylbenzylidene) sorbitol, 1,3:2,4-bis(o-2,4-dimethylbenzylidene)sorbitol, 1,3:2,4-bis(o-4-ethylbenzylidene) sorbitol, 1,3:2,4-bis(o-4-chlorobenzylidene sorbitol, and 1,3:2,4-dibenzylidenesorbitol. The dibenzylidenesorbitol or its derivatives are commercially available as Gelol MD and Gelol MD-LM30 (product names) from New Japan Chemical Co., Ltd. Examples of the partial metal salts of rosin acids include Pinecrystal KM1600, Pinecrystal KM1500 and Pinecrystal KM1300 (product names) available from Arakawa Chemical Industries Ltd. Examples of the inorganic particles include talc, clay, mica, asbestos, glass fibers, glass flakes, glass beads, calcium silicate, montmorillonite, bentonite, graphite, aluminum powder, alumina, silica, diatomaceous earth, titanium oxide, magnesium oxide, pumice stone powder, pumice balloons, aluminum hydroxide, magnesium hydroxide, basic magnesium carbonate, dolomite, calcium sulfate, potassium titanate, barium sulfate, calcium sulfite, and molybdenum sulfide. Examples of the amides include adipic acid dianilide and suberic acid dianilide. These nucleating agent may be used alone or in combination of two or more.

In the present invention, preferably used as the nucleating agents are inorganic fine particles of talc and a metal salt of an organophosphoric acid represented by the following general formula:

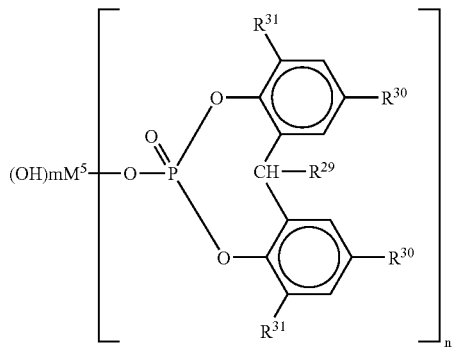

wherein $R^{29}$ is hydrogen or $C_1$-$C_4$ alkyl; $R^{30}$ and $R^{31}$ are each individually hydrogen, $C_1$-$C_{12}$ alkyl, cycloalkyl, aryl or aralkyl; $M^5$ is alkali metal, alkaline earth metal, aluminum or zinc; m is 0 and n is 1 when $M^5$ is alkali metal; n is 1 and m is 1, or n is 2 and m is 0 when $M^5$ is alkaline earth metal or zinc; and m is 1 and n is 2 when $M^5$ is aluminum, because these nucleating agents generate little odor, rendering the films suitable for food applications. The organophosphoric acid metal salt may be available from Asahi Denka Kogyo K.K. under trade names of Adekastab NA-11 and Adekastab NA-21.

Films including, as the nucleating agent, the inorganic particles such as talc improve the workability of fabrication such as bag-forming and printing because excellent in slip properties, and are suitable for producing general-purpose packaging films by a high-speed production machine such as various types of automatic filling and packaging laminators. Films including, as the nucleating agent, the dibenzylidenesorbitol or its derivatives are suitable for producing packaging films for toys, stationery, etc. because excellent in transparency and display effect. Films including, as the nucleating agent, the amides are suitable for producing any types of general-purpose packaging films by high-speed bag making machines because capable of preventing defects such as winding wrinkle owing to their excellent rigidity.

The nucleating agents and additives used optionally may be dry-blended with the propylene polymer in a Henschel mixer or the like, or may be melt-kneaded with the propylene polymer in a single- or twin-screw extruder, a Banbury mixer or the like. The high-melting polymers may be added to a reactor at once or gradually during the production of the propylene polymer.

The addition amount of the nucleating agent is usually 10 ppm or more, preferably 10 to 10,000 ppm, more preferably 10 to 5,000 ppm, still more preferably 10 to 2,500 ppm based on the propylene polymer (A) or the propylene homopolymer (A-1). When the amount is less than 10 ppm, the processability of the film cannot be improved. The use exceeding 10,000 ppm creates no additional effect.

In addition to the nucleating agent, the propylene polymer (A) or the propylene homopolymer (A-1) may contain, as described above, other additives such as anti-oxidants, neutralizers, slipping agents, anti-blocking agents, anti-fogging agents, anti-static agents.

The anti-oxidants may be phosphorus anti-oxidants, phenol anti-oxidants and sulfur anti-oxidants.

Examples of the phosphorus anti-oxidants include tris (nonylphenyl) phosphite, tris(2,4-di-tert-butylphenyl)phosphite, distearylpentaerythritol diphosphite, bis(2,4-di-tert-butylphenyl)pentaerythritol phosphite, bis(2,6-di-tert-butyl-4-methylphenyl)pentaerythritol phosphite, 2,2-methylenebis(4,6-di-tert-butylphenyl)octyl phosphite, tetrakis(2,4-di-tert-butylphenyl)-4,4-biphenylene diphosphonite, Adekastab 1178 (Asahi Denka Kogyo K.K.), Sumiriser TNP (Sumitomo Chemical Company Ltd.), JP-135 (Johoku Kagaku Co., Ltd.), Adekastab 2112 (Asahi Denka Kogyo K.K.), JPP-2000 (Johoku Kagaku Co., Ltd.), Weston 618 (GE Co., Ltd.), Adekastab PEP-24G (Asahi Denka Kogyo K.K.), Adekastab PEP-36 (Asahi Denka Kogyo K.K.), Adekastab HP-10 (Asahi Denka Kogyo K.K.), Sandstab P-EPQ (Clarient Corp.), and Phosphite 168 (Ciba Specialty Chemicals Co., Ltd.).

Examples of the phenol anti-oxidants include 2,6-di-t-butyl-4-methyl phenol, n-octadecyl-3-(3',5'-di-tert-butyl-4'-hydroxyphenyl)propionate, tetrakis[methylene-3-(3,5-di-tert-butyl-4-hydroxyphenyl)propionate]methane, tris(3,5-di-tert-butyl-4-hydroxybenzyl)isocyanurate, 4,4'-butylidenebis-(3-methyl-6-tert-butyl phenol), triethylene glycol-bis[3-(3-tert-butyl-4-hydroxy-5-methylphenyl)propionate], 3,9-bis{2-[3-(3-tert-butyl-4-hydroxy-5-methylphenyl)propionyloxy]-1,1-dimethylethyl}-2,4,8,10-tetraoxaspiro[5.5]undecane, Sumiriser BHT (Sumitomo Chemical Company Ltd.), Yoshinox BHT (Yoshitomi Seiyaku Co., Ltd.), Antage BHT (Kawaguchi Kagaku Co., Ltd.), Irganok 1076 (Ciba Specialty Chemicals Corp.), Irganox 1010 (Ciba Specialty Chemicals Corp.), Adekastab AO-60 (Asahi Denka Kogyo K.K.), Sumiriser BP-101 (Sumitomo Chemical Company Ltd.), Tominox TT (Yoshitomi Seiyaku Co., Ltd.), TTHP (Toray Industries), Irganox 3114 (Ciba Specialty Chemicals Corp.), Adekastab AO-20 (Asahi Denka Kogyo K.K.), Adekastab AO-40 (Asahi Denka Kogyo K.K.), Sumiriser BBM-S (Sumitomo Chemical Company Ltd.), Yoshinox BB (Yoshitomi Seiyaku Co., Ltd.), Antage W-300 (Kawaguchi Kagaku Co., Ltd.), Irganox 245 (Ciba Specialty Chemicals Corp.), Adekastab AO-70 (Asahi Denka Kogyo K.K.), Tominox 917 (Yoshitomi Seiyaku Co., Ltd.), Adekastab AO-80 (Asahi Denka Kogyo K.K.), and Sumiriser GA-80 (Sumitomo Chemical Company Ltd.).

Examples of the sulfur anti-oxidants include dilauryl-3,3'-thiodipropionate, dimyristyl-3,3'-thiodipropionate, distearyl-3,3'-thiodipropionate, pentaerythritol tetrakis(3-laurylthiopropionate), SUMIRISER TPL (Sumitomo Chemical Company Ltd.), Yoshinox DLTP (Yoshitomi Seiyaku Co., Ltd.), Antiox L (NOF Corporation), Sumiriser TPM (Sumitomo Chemical Company Ltd.), Yoshinox DMTP (Yoshitomi Seiyaku Co., Ltd.), Antiox M (NOF Corporation), Sumiriser TPS (Sumitomo Chemical Company Ltd.), Yoshinox DSTP (Yoshitomi Seiyaku Co., Ltd.), Antiox S(NOF Corporation), Ltd., Adekastab AO-412S (Asahi Denka Kogyo K.K.), Seenox 412S (Sipro Kasei Co., Ltd.), and Sumiriser TDP (Sumitomo Chemical Company Ltd.).

Preferred phenol anti-oxidants are:

Irganox 1010 (pentaerythrityl-tetrakis[3-(3,5-di-tert-butyl-4-hydroxyphenyl) propionate]) available from Ciba Specialty Chemicals Corp.;

Irganox 1076 (octadecyl-3-(3,5-di-tert-butyl-4-hydroxyphenyl) propionate) available from Ciba Specialty Chemicals Corp.;

Irganox 1330 (1,3,5-trimethyl-2,4,6-tris(3,5-di-tert-butyl-4-hydroxybenzyl) benzene) available from Ciba Specialty Chemicals Corp.; and Irganox 3114 (tris(3,5-di-tert-butyl-4-hydroxybenzyl)isocyanurate) available from Ciba Specialty Chemicals Corp.

Preferred phosphorus anti-oxidants are:

Irgaphos 168 (tris(2,4-di-t-butylphenyl)phosphite) available from Ciba Specialty Chemicals Corp.; and P-EPQ (tetrakis(2,4-di-t-butylphenyl)-4,4'-biphenylene diphosphite) available from Clarient Corp.

The amount of the anti-oxidant, when used, is about 0.001 to about 1 part by weight based on 100 parts by weight of the propylene polymer (A) or the propylene homopolymer (A-1). The addition of the anti-oxidant preferably prevents the yellowing, etc. of the polymer.

As the neutralizers, particularly preferred are calcium stearate, zinc stearate, magnesium stearate, hydrotalcite such as DHT-4A (composition: $Mg_{4.5}Al_2(OH)_{13}CO_3 \cdot 3.5H_2O$) available from Kyowa Kagaku Kogyo Co., Ltd., and lithium-aluminum composite hydroxide such as Mizukalac ($[Li_2Al_4(OH)_{12}]CO_3 \cdot mH_2O$ wherein m is ca. 3) available from Mizusawa Kagaku Kogyo Co., Ltd.

As the anti-blocking agents, particularly preferred are a synthetic silica anti-blocking agent "SAILICIA" available from Fuji Silysia Co., Ltd., and a synthetic silica anti-blocking agent "MIZUKASIL" available from Mizusawa Kagaku Kogyo Co., Ltd.

Particularly preferred slipping agents are erucamide, oleamide, stearamide, behenamide, ethylene bisstearamide, ethylene bisoleamide, stearyl erucamide, and oleyl palmitamide.

The addition amount of each additive is about 0.001 to about 1 part by weight based on 100 parts by weight of the propylene polymer (A) or the propylene homopolymer (A-1). Examples of the additive formulation are shown below.

Additive Formulation (1) Anti-Oxidant 1000 ppm of Irganox 1010 available from Ciba Specialty Chemicals Corp., and 1000 ppm of Irgaphos 168 available from Ciba Specialty Chemicals Corp.;

(2) Neutralizer 1000 ppm of calcium stearate;

(3) Anti-Blocking Agent 2300 ppm of a silica anti-blocking agent available from Fuji Silysia Co., Ltd.; and (4) Slipping Agent 500 ppm of erucamide.

(II) Second Polypropylene Film

The second polypropylene film satisfied the following requirements of: According to a second aspect of the present invention, there is provided a polypropylene film satisfying the following requirements of:

(1) having a tensile modulus (TM) of from 5 to 500 MPa;

(2) having, when measured by a differential scanning calorimeter (DSC), no melting point or a melting point Tm (° C.) satisfying the following formula:

$$TM \geq 5 \times Tm - 450; \text{ and}$$

(3) having an intrinsic viscosity [η] of from 1 to 3 dL/g as measured at 135° C. in tetralin.

The tensile modulus TM of the second polypropylene film is from 5 to 500 MPa, and preferably from 5 to 250 MPa from the standpoint of flexibility.

Showing no melting point Tm (° C.) in DSC measurement suggests that the heat seal temperature of the second polypropylene film can be lowered, i.e., means an excellent low-temperature heat sealability. Also, showing a melting point Tm (° C.) satisfying the above relationship between Tm and the tensile modulus TM means that the heat seal temperature and the heat seal strength are well balanced and shaped articles such as films are excellent in rigidity such as a tensile modulus and an impact resistance. The method for measuring Tm is described above.

The melting point Tm of the second polypropylene film, if measured in the DSC measurement, satisfies the following relationship:

$$TM \geq 5 \times Tm - 450.$$

When TM fails to satisfy the relationship, the heat seal temperature and the sealing strength come to be ill-balanced. The relationship between TM and Tm is preferably $$TM \geq 5 \times Tm - 400, \text{ more preferably}$$

$$TM \geq 5 \times Tm - 350.$$

The method for measuring TM (MPa) measuring will be described in detail in Examples below.

The intrinsic viscosity [η] of the second polypropylene film is 1 to 3 dL/g, preferably 1 to 2.5 dL/g, more preferably 1.5 to 2.0 dL/g when measured at 135° C. in tetralin. When the intrinsic viscosity is less than 1 dL/g, the film becomes sticky. When exceeding 3 dL/g, the film has a poor processability because of deteriorated melt fluidity. The method for measuring [η] will be described in detail in Examples below.

The second polypropylene film has a high rigidity and an excellent low-temperature heat sealability as described above, and is therefore suitable as food packaging films, agricultural films (for use in, e.g., a vinyl plastic hot house) and sealant films or the like.

Like the first polypropylene film, the second polypropylene film can prevent the tacky component from bleeding out into the surface because the film is produced from a propylene polymer having a limited H25 and a narrow molecular weight distribution (Mw/Mn). Therefore, the film is less tacky and excellent in the fabrication ability in addition to the surface properties. The second polypropylene film has an internal haze of 5% or less, preferably 3% or less as determined from its haze value measured according to JIS K-7105, and therefore, exhibits excellent transparency. Also, the second polypropylene film has an impact resistance of 10,000 J/m² or higher, preferably 15,000 J/m² or higher as measured by a film impact tester available from Toyo Seiki Seisaku-Sho, Co., Ltd. using a ½ inch impact head, and therefore, exhibits an excellent impact resistance.

Specifically, as the second polypropylene film, there may be exemplified a film produced from the propylene polymer (A) or the propylene homopolymer (A-1) mentioned above.

(II-1) Propylene Polymer (A)

The characteristics of the propylene polymer (A) and the propylene homopolymer (A-1), the polymerization catalysts used and the polymerization conditions are the same as described above. The meso pentad fraction [mmmm] of the propylene homopolymer (A-1) for producing the second polypropylene film is preferably from 20 to 60 mol %, more preferably from 30 to 60 mol %.

(II-3) Production of Polypropylene Film

The second polypropylene film is produced in the same manner as in the production of the first polypropylene film. Like the first polypropylene film, the second polypropylene film may be blended with the nucleating agents, antioxidants, neutralizers, slipping agents, anti-blocking agents, anti-fogging agents, anti-static agents or the like, if necessary.

(III) Multilayered Laminate

In the multilayered polyolefin resin laminate of the present invention, at least one outermost layer is produced from the propylene polymer (A).

The multilayered polyolefin resin laminate of the present invention has excellent low-temperature heat sealability and attains sufficient interlaminar strength without the use of an adhesive and the like, because at least one outermost layer is produced from the propylene polymer (A) being less tacky and excellent in transparency.

With at least one outermost layer produced from the propylene polymer (A), the multilayered polyolefin resin laminate is well-balanced between the amount of the tacky component, low elastic modulus and transparency. That is, the multilayered polyolefin resin laminate is advantageously low in the elastic modulus, excellent in the softness (flexibility) and transparency, and small in the amount of tacky component which results in excellent surface properties (little bleeding of tacky component, little migration of tacky component to other articles).

In addition to the above requirements, the fraction (W25) eluted at 25° C. or lower of the propylene polymer (A) for producing the multilayered polyolefin resin laminate is preferably from 20 to 100% by weight, more preferably from 30 to 100% by weight, most preferably from 50 to 100% by weight when measured by temperature programmed chromatography. W25 is an index showing whether the propylene polymer is soft or not. Higher W25 means a larger amount of high elastic modulus component and a broader stereoregularity distribution. When W25 is less than 20 wt %, the propylene polymer tends to be undesirably reduced in flexibility. Meanwhile, W25 is defined as the amount (% by weight) of the fraction that is eluted at a column temperature of 25° C. without being adsorbed to fillers of a TREF column, as determined by an elution curve of temperature programmed chromatography using the measuring method, apparatus and conditions described below.

The propylene polymer (A) for the multilayered laminate is not particularly restricted as far as it meets the above requirements. For example, the propylene polymer (A) may be the above propylene homopolymer (A-1) and a propylene copolymer (A-2) described below.

(III-1) Propylene Homopolymer (A-1)

The propylene homopolymer (A-1) mentioned above may be used for producing the multilayered laminate. The meso pentad fraction [mmmm] thereof is preferably from 20 to 60 mol %, more preferably from 30 to 50 mol %.

By using such a propylene homopolymer (A-1), the amount of tacky component, low elastic modulus and transparency come to be well-balanced.

That is, the multilayered polyolefin resin laminate is advantageously low in the elastic modulus, excellent in the softness (flexibility) and transparency, and small in the amount of tacky component which results in excellent surface properties (little bleeding of tacky component, little migration of tacky component to other articles). As a result thereof, a multilayered polyolefin resin laminate having an excellent low-temperature heat sealability and a sufficient interlaminar strength without the use of an adhesive and the like can be obtained.

In addition to the above requirements, it is preferred for excellent flexibility that the melting endotherm ΔH of the propylene homopolymer (A-1) is 20 J/g or less when measured by DSC. The ΔH is an index showing whether the polymer is soft or not. Larger ΔH means a higher elastic modulus and the reduction in flexibility. ΔH is determined by the method as described above.

The propylene homopolymer (A-1) may or may not have a melting point (Tm) and a crystallization temperature (Tc). From the standpoint of flexibility, it is preferable that the propylene homopolymer (A-1) has either no Tm and Tc or low Tm and Tc. Particularly, Tm is preferred to be 100° C. or lower. Tc is determined by DSC measurement. Namely, by using a differential scanning colorimeter ("DSC-7" available from Perkin-Elmer Corp.), 10 mg of a sample was melted by heating at 230° C. for 3 min in nitrogen atmosphere, and then cooled to 0° C. at a rate of 10° C./min. The peak top of the maximum peak in the crystallization endotherm curve is the crystallization temperature Tc.

In addition to the above requirements, the propylene homopolymer (A-1) preferably contains a fraction extractable with boiling diethyl ether, as an index of elastic modulus, in an amount of 5% by weight or more. The method for measurement of the content of fraction extractable with boiling diethyl ether will be described below.

In addition to the above, the tensile modulus of the propylene homopolymer (A-1) is preferably 100 MPa or lower, more preferably 70 MPa or lower.

(III-2) Propylene Copolymer (A-2)

The propylene copolymer (A-2) has a stereoregularity index (P) of from 55 to 90 mol % as measured by $^{13}$C-NMR.

The use of the propylene copolymer (A-2) satisfying the above requirement enables the production of a multilayered laminate that is well-balanced between the amount of tacky component, low elastic modulus and transparency. That is, the multilayered polyolefin resin laminate is advantageously low in the elastic modulus, excellent in the softness (flexibility) and transparency, and small in the amount of tacky component which results in excellent surface properties (little bleeding of tacky component, little migration of tacky component to other articles).

The stereoregularity index (P) is determined based on a meso triad fraction [mm] of propylene chain as measured by using $^{13}$C-NMR spectrometer "JNM-EX400 Model" manufactured by JEOL Ltd. under the same measuring conditions as in the measurement of the pentad fraction and the like as described below. Larger value of P means higher stereoregularity of the copolymer. The stereoregularity index (P) of the propylene copolymer (A-2) is more preferably from 65 to 80 mol %. When the stereoregularity index (P) is less than 55 mol %, the processability becomes poor because the elastic modulus is excessively lowered. When the stereoregularity index (P) exceeds 90 mol %, the copolymer tends to lose softness to become hard.

In addition to the above requirement, it is preferred for excellent flexibility that the melting endotherm. ΔH of the propylene copolymer (A-2) is 20 J/g or less when measured by DSC. The propylene copolymer (A-2) may or may not have a melting point (Tm) and a crystallization temperature (Tc). From the standpoint of flexibility, it is preferable that the propylene copolymer (A-2) has either no Tm and Tc or low Tm and Tc. Particularly, Tm is preferred to be 100° C. or lower.

Further, in addition to the above, the propylene copolymer (A-2) preferably contains a fraction extractable with boiling diethyl ether, as an index of elastic modulus, in an amount of 5% by weight or more, and has a tensile modulus of preferably 100 MPa or lower, more preferably 70 MPa or lower.

As the propylene copolymer (A-2), there may be exemplified copolymers obtained by copolymerizing propylene with ethylene and/or $C_4$-$C_{20}$ α-olefin. Examples of $C_4$-$C_{20}$ α-olefins include 1-butene, 1-pentene, 4-methyl-1-pentene, 1-hexene, 1-octene, 1-decene, 1-dodecene, 1-tetradecene, 1-hexadecene, 1-octadecene, and 1-eicosene. These α-olefins may be used alone or in combination of two or more.

Also, the propylene copolymer (A-2) is preferably a random copolymer containing structural units resulting from propylene in an amount of preferably 90 mol % or more, more preferably 95 mol % or more.

In addition to the above requirements, the propylene polymer (A), the propylene homopolymer (A-1) and the propylene copolymer (A-2) preferably have a molecular weight distribution (Mw/Mn) of 4 or less as measured by gel permeation chromatography (GPC) and/or an intrinsic viscosity [η] of 0.5 to 15.0 dL/g as measured at 135° C. in tetralin, more preferably have Mw/Mn of 3.5 or less and/or [η] of 1.0 to 5.0 dL/g, and most preferably have Mw/Mn of 3 or less and/or [η] of 1.0 to 3.0. When the molecular weight distribution (Mw/Mn) exceeds 4 or the intrinsic viscosity [η] is less than 0.5 dL/g, the polymer tends to become sticky. When the intrinsic viscosity [η] exceeds 15.0 dL/g, the fluidity becomes low to render the processability poor. The measuring conditions of gel permeation chromatography (GPC) for determining Mw/Mn will be described below.

The propylene polymer (A), the propylene homopolymer (A-1) and the propylene copolymer (A-2) are preferably produced by polymerizing propylene, or polymerizing propylene with ethylene and/or $C_4$-$C_{20}$ α-olefin, in the presence of the above polymerization catalyst under the polymerization conditions as described above.

Various additives may be added to the propylene polymer (A), the propylene homopolymer (A-1) and the propylene copolymer (A-2), if necessary. Examples of the optional additives include, as mentioned above, nucleating agents, anti-oxidants, neutralizers, slipping agents, anti-blocking agents, anti-fogging agents, and anti-static agents. These additives may be used alone or in combination of two or more in respective amounts as described above.

(III-3) Structure and Production of Multilayered Laminate

The multilayered polyolefin resin laminate of the present invention is a laminate in which at least one outermost layer (hereinafter referred to as "heat-seal layer") is produced from any of the propylene polymer (A), the propylene homopolymer (A-1) and the propylene copolymer (A-2), without particular limitations on any other layers (hereinafter referred to as "intermediate layer" or "laminate layer"). The other layers may be produced from various polymers other than the propylene polymer (A), the propylene homopolymer (A-1) and the propylene copolymer (A-2). Of such various polymers, preferred is a propylene polymer. As the propylene polymer, any propylene polymer having crystallinity (hereinafter referred to as "crystalline propylene polymer") can be used without particular limitation. Examples of the crystalline propylene polymer include propylene homopolymers, propylene-ethylene random copolymers, propylene-ethylene-1-butene random copolymers, and propylene-ethylene block copolymers. The molecular weight of any of the crystalline propylene polymers is determined according to the desired processability. For example, the melt index (at 230° C., 2160 gf is preferably about 2 to 20 g/10 min for T-die cast film-forming, and preferably about 1 to 10 g/10 min for sheet forming. According to the intended use of films and sheets, a suitable polymer is selected from those having various melt indices. For example, a propylene homopolymer of high melting point and high crystallinity is suitable for the application in which heat resistance and heat seal strength are important. Such a polymer is disclosed in Japanese Patent Application Laid-Open No. 8-85711. The proposed polymer satisfies:

(1) an isotactic pentad fraction P, an index of the stereoregularity, is from 85.0 to 92.0 mol % and a n-heptane insoluble H is from 93.0 to 97.0% by weight, and P and H satisfy the following formula:

$$0.750P + 27.125 < H; \text{ and}$$

(2) a melt index MI (230° C., 2160 gf: the same applies hereinafter) is from 1 to 20 g/10 min and satisfies the following formula:

$$\tau \leq 0.65 - 0.025 MI$$

wherein τ is a relaxation time at frequency $\omega_0 = 10^0$ rad/sec that is measured by a frequency dispersion measurement at 175° C.

Preferred polymer satisfies:

(1') the isotactic pentad fraction P is from 85.0 to 92.0 mol % and the n-heptane insoluble H is from 86.0 to 97.0% by weight, and P and H satisfy the following formula:

$$0.750P+26.000<H; \text{ and}$$

(2') the melt index MI is from 1 to 25 g/10 min, and satisfies the following formula:

$$\tau \leq 0.63-0.025MI$$

wherein $\tau$ is as defined above.

The definitions and measuring methods of P, H, MI, $\omega_0$, and $\tau$, and the production method of the propylene polymer are as described in Japanese Patent Application Laid-Open No. 8-85711.

Further, in order to improve low-temperature heat sealability of the film or sheet, preferably usable are a propylene-ethylene random copolymer, a propylene-ethylene 1-butene random copolymer (hereinafter referred to as "propylene random copolymers") excellent in low-temperature heat sealability, which are disclosed in, e.g., Japanese Patent Application Laid-Open Nos. 9-208629, 9-272718 and 10-130336. The propylene random polymer proposed in Japanese Patent Application Laid-Open No. 9-208629 is a propylene-ethylene random copolymer and satisfies the following requirements (1) to (5):

(1) an ethylene unit content $\chi$ is from 3 to 10% by weight;

(2) a melt index MI is from 4 to 12 g/10 min;

(3) a fraction E (wt %) extractable with boiling diethyl ether and X satisfy the following formula (I) or (II):

$$E \leq 0.25\chi+1.1 (\chi=3 \text{ to } 6\% \text{ by weight}) \quad (I)$$

$$E \leq 2.6 (\chi=6 \text{ to } 10\% \text{ by weight}) \quad (II);$$

(4) a melting point Tm (° C.) measured by differential scanning calorimeter and $\chi$ satisfy the following formula (III) or (IV):

$$Tm \leq 140 (\chi=3 \text{ to } 5\% \text{ by weight}) \quad (III)$$

$$Tm \leq 165-5\chi (\chi=5 \text{ to } 10\% \text{ by weight}) \quad (IV); \text{ and}$$

(5) an isotactic triad fraction [mm] of PPP chain is 98.0 mol % or more as measured by $^{13}$C-NMR.

The propylene random polymer proposed in Japanese Patent Application Laid-Open No. 9-272718 is a propylene-ethylene random copolymer and satisfies the following requirements (1) to (5):

(1) an ethylene unit content X is from 0.2 to 4% by weight;

(2) a melt index MI is from 4 to 12 g/10 min;

(3) a fraction E (wt %) extractable with boiling diethyl ether and X satisfy the following formula (1):

$$E \leq 0.25\chi+1.1 \quad (1)$$

(4) a melting point Tm (° C.) measured by differential scanning calorimeter and $\chi$ satisfy the following formula (2):

$$Tm \leq 165-5\chi \quad (2); \text{ and}$$

(5) an isotactic triad fraction [mm] of PPP chain is 98.0 mol % or more as measured by $^{13}$C-NMR.

The propylene random polymer proposed in Japanese Patent Application Laid-Open No. 11-60639 is a propylene-ethylene-1-butene random copolymer and satisfies the following requirements (1) to (6):

(1) an ethylene unit content $\alpha$ (mol %) and a 1-butene unit content $\beta$ (mol %) satisfy the following formula (1):

$$4 \leq \alpha+\beta \leq 15 \quad (1);$$

(2) a melt index MI is from 1 to 12 g/10 min;

(3) a fraction E extractable with boiling diethyl ether and ($\alpha+\beta$) satisfy the following equation (2) when $\alpha+\beta \leq 12$, and satisfy the following equation (3) when $\alpha+\beta>12$:

$$E \leq 0.2(\alpha+\beta)+0.6 \quad (2)$$

$$E \leq 3.0 \quad (3);$$

(4) a melting point Tm (° C.) measured by differential scanning calorimeter and ($\alpha+\beta$) satisfy the following formula (4):

$$Tm \leq 164-3.6(\alpha+\beta) \quad (4);$$

(5) a stereoregularity index P is 98 mol % or higher as measured by $^{13}$C-NMR; and (6) a ratio Mw/Mn is 6 or less, wherein Mw is a weight-average molecular weight and Mn is a number-average molecular weight as measured by gel permeation chromatography (GPC).

The definitions and measuring methods of the parameters as well as the production methods of the polymers are as described in the corresponding patent documents. Films and sheet produced from a propylene polymer (crystalline propylene polymer and propylene random copolymer) with no crystallinity tend to be deteriorated in rigidity and heat resistance.

In particularly preferred embodiment, the multilayered polyolefin resin laminate of the present invention has at least one intermediate or laminate layer produced from the crystalline propylene polymer other than the propylene polymers (A), (A-1) and (A-2).

The intermediate or laminate layer may be produced from a dry blend of the crystalline propylene polymer and the propylene random copolymer prepared using a Henschel mixer or the like, or may be produced from a melt-kneaded mixture prepared using a single- or twin-screw extruder, a Banbury mixer or the like. The mixing ratio of the propylene random copolymer is usually from 1 to 99% by weight, preferably from 10 to 90% by weight, most preferably from 20 to 80% by weight. When the mixing ratio of the propylene random copolymer is less than 1% by weight, the intermediate layer or laminate layer tends to be deteriorated in transparency and impact resistance.

The multilayered polyolefin resin laminate of the present invention may be produced by any suitable production method without particular limitation, for example, by a melt co-extrusion. Particularly, a T-die casting method is preferable because a high-speed forming using a large forming machine is applicable. The high-speed film forming may be conducted under conditions of a take-off speed of about 50 m/min or higher. The thickness of the multilayered laminate is not particularly restricted, and is usually about 10 to 5,000 μm.

The multilayered polyolefin resin laminate of the present invention is not particularly limited as long as it is produced as described above. Preferably, the multilayered polyolefin resin laminate satisfies the following relationship between a tensile modulus TM (MPa) and a heat seal temperature HST (° C.):

$$TM \geq 12.5 \times HST - 700.$$

The methods for measuring the tensile modulus TM and the heat seal temperature HST will be described in detail in Examples below.

The present invention will be described in more detail by reference to the following examples. However, it should be noted that the following examples are only illustrative and not intended to limit the invention thereto.

The resins properties of polymers, films and multilayer laminates were evaluated by the following methods.

Resin Properties (1) [η]

The intrinsic viscosity of the polymer was measured at 135° C. in tetralin using an automatic viscometer "VMR-053 Model" available from Rigosha Co., Ltd.

(2) Pentad Fraction, Triad Fraction and Abnormal Insertion

The peaks of $^{13}$C-NMR spectra obtained under the following conditions were assigned according to the method proposed by A. Zambelli, et al., Macromolecules, 8, 687 (1975).

Apparatus: $^{13}$C-NMR spectrometer "JNM-EX400 Model" manufactured by JEOL Ltd.
Method: complete proton decoupling method
Concentration: 220 mg/mL
Solvent: 1,2,4-trichlorobenzene/heavy benzene mixed solvent (90/10 by volume)
Temperature: 130° C.
Pulse width: 45°
Pulse interval: 4 s
Integration: 10,000 times (3) Molecular Weight Distribution (Mw/Mn)

Mw/Mn was calculated from the weight-average molecular weight Mw and the number-average molecular weight Mn which were measured by GPC under the following conditions and calibrated based on polyethylene standard.

GPC Apparatus:
Column: Toso GMHHR-H(S)HT
Detector: RI Detector "WATERS 150C" for liquid chromatogram Measuring Conditions:
Solvent: 1,2,4-trichlorobenzene
Measuring temperature: 145° C.
Flow rate: 1.0 mL/min
Sample concentration: 2.2 mg/mL
Injection amount: 160 μL
Calibration curve: Universal Calibration
Analytic program: HT-GPC (Ver. 10)

(4) DSC Measurement

A differential scanning calorimeter ("DSC-7" available from Perkin Elmer Co., Ltd.) was used. After melting 10 mg sample by heating at 230° C. for 3 min in nitrogen atmosphere, the sample was cooled to 0° C. at a rate of 10° C./min. The cooed sample was kept at 0° C. for 3 min, and then heated at a temperature rise rate of 10° C./min to obtain a melting endotherm curve. The melting endotherm was expressed as ΔH. The peak top of the maximum peak of the melting endotherm curve was taken as the melting point Tm (° C.).

(5) Measurement of W25 by Temperature Programmed Chromatography (a) Measuring Method A sample solution was introduced into a TREF column at 135° C., and then gradually cooled to 0° C. at 5° C./min. The temperature was kept at 0° C. for 30 min to adsorb the sample on the packed adsorbent. The temperature was then raised to 135° C. at 40° C./h to obtain an elution curve. The amount of a fraction eluted in a temperature range of Tp±5C, wherein Tp is a peak temperature appeared in the elution curve, was determined.

(b) Apparatus

TREF column: silica gel column (4.6ϕ×150 mm) available from GL Science Co., Ltd.;
Flow cell: KBr cell with 1-mm optical path available from GL Science Co., Ltd;
Feed Pump: SSC-3100 available from Senshu Kagaku Co., Ltd.;
Valve oven: MODEL 554 (high-temperature type) available from GL Science Co., Ltd.;
TREF oven: available from GL Science Co., Ltd.;
Two-line temperature controller: REX-C100 available from Rigaku Kogyo Co., Ltd;
Detector: IR Detector "MIRAN 1A CVF" for liquid chromatography available from Foxboro Co., Ltd.;
10-Way valve: electric valve available from Balco Co., Ltd; and
Loop: 500 μL loop available from Balco Co., Ltd.

(c) Measuring Conditions
Solvent: o-dichlorobenzene;
Sample concentration: 7.5 g/L;
Injection amount: 500 μL;
Pumping flow: 2.0 mL/min;
Detection wave number: 3.41 μm;
Adsorbent: Chromosorb P (30-60 mesh); and
Column temperature distribution: within ±0.2° C.

(6) Fraction Extracted with Boiling Diethyl Ether

The measurement was performed using a Soxhlet extractor under the following conditions.
Sample amount: 1 to 2 g;
Sample form: powder (pulverized into powder, if pellets were used);
Extractant: diethyl ether;
Extraction time: 10 h;
Extraction frequency: 180 times or more; and
Content: Calculated from the following equation:

[extracted amount (g)/charged amount (g)]×100.

(7) 25° C. Hexane Soluble Content (H25)

H25 was measured under the following condition.
Sample amount: 0.1 to 5 g;
Sample form: powder (pulverized into powder, if pellets were used)
Solvent: hexane
Elution condition: 25° C., 3 or more days; and
Content: calculated from the following equation:

$$H25=[(W_0-W_1)/W_0]\times 100(\%).$$

Evaluation of Films

After film-forming, films were subjected to aging at 40° C. for 24 h and then to conditioning at 23±2° C. and a humidity of 50±10%. The measurements were conducted under the same temperature and humidity conditions.

(1) Tensile Modulus and Breaking Strength

Determined according to tensile test of JIS K-7127 under the following conditions:

Cross-head speed: 500 mm/min
Load cell: 15 kg
Measuring direction: machine direction (MD direction)

(2) Impact Resistance

Evaluated by the impact strength measured using a film impact tester with ½ inch impact head available from Toyo Seiki Seisaku-Sho, Co., Ltd.

(3) Internal Haze

The haze of a sample with its surface coated with oil was measured according to JIS K-7105. The measured value was taken as the internal haze.

(4) Heat-Seal Temperature

The heat-seal temperature was measured according to JIS Z-1707. The heat-sealing conditions were shown below. The temperature of the heat seal bar was calibrated by a surface thermometer. The heat-sealed films were left overnight at room temperature, and then, the peel strength (sealing strength) was measured by T-peel test at room temperature at a peeling speed of 200 mm/min. The heat-seal temperature was expressed by a temperature at which the peel strength was 2.94 N/15 mm calculated from a seal temperature-peel strength curve.

Sealing time: 2 sec;
Sealing area; 15×10 mm;
Sealing pressure: 0.52 MPa; and
Sealing temperature; measured several times for interpolation.

(5) Anti-Blocking Properties

Two films were press-contacted under the following conditions with the metal-rolled surface of one of the films opposing to the non-metal rolled surface of the other. The films were fixedly mounted on a 10 cm×10 cm jig, and the peel strength of 10 cm×10 cm area was measured under the following conditions. Smaller the peel strength, more excellent the anti-blocking properties.

Contact Conditions:
Temperature: 60° C.
Period: 7 days
Load: 15 g/cm$^2$
Contact area: 10 cm×10 cm;
Peeling Conditions:
Peeling speed: 20 mm/min
Load cell: 2 kg Evaluation of Multilayered Laminate After the production, the laminates were annealed at 40° C. for 24 h and then conditioned at 23±2° C. and a humidity of 50±10% for 16 h or more. The measurements were conducted at the same temperature and humidity.

(1) Interlaminar Strength

The interlaminar strength was rated as "poor" when the heat-seal layer was separated from the other layer by pulling with tweezers, and rated as "good" when not separated from the other layer.

(2) Tensile Modulus

Measured in the same manner as in Evaluation of Films (1).

(3) Heat Seal Strength and Heat Seal Temperature.

Measured in the same manner as in Evaluation of Films (4).

SYNTHESIS EXAMPLE 1

Preparation of Catalyst (1) Preparation of (1,2'-ethylene)(2,1'-ethylene)-bis (3-methylindene)

Into 50 mL of dehydrated ether, was dissolved 1.12 g (3.94 mmol) of (1,2'-ethylene)(2,1'-ethylene)-bis(indene) under nitrogen flow. After cooling the solution to −78° C., 5.01 mL of a 1.57 mol/L solution of n-butyllithium in hexane (n-butyllithium: 7.87 mmol) was added dropwise over 30 min, and then, the temperature was raised to room temperature to stir for 8 h. The ether solvent was removed by distillation under reduced pressure and the residue was washed with hexane to obtain 1.12 g (3.02 mmol) of a dilithium salt as ether adduct. The dilithium salt was dissolved in 50 mL of dehydrated tetrahydrofuran, and cooled to −78° C. After adding dropwise 10 mL of a tetrahydrofuran solution containing 0.42 mL (6.74 mmol) of methyl iodide to the solution over 20 min, the temperature was raised to room temperature and the stirring was continued for 8 h. The solvent was removed by distillation under reduced pressure and the residue was extracted with ethyl acetate. The extract was washed with water and the organic phase was dried over anhydrous magnesium sulfate, and then filtered. The filtrate was dried and evaporated to dryness to obtain 0.87 g (2.78 mmol) of the title (1,2'-ethylene)(2,1'-ethylene)-bis(3-methylindene) (yield: 70.5%) as a mixture of isomers on the position of double bond in 5-membered ring.

(2) Preparation of Dilithium Salt of (1,2'-ethylene) (2,1'-ethylene)-bis(3-methylindene)

Into 35 mL of ether, was dissolved 0.78 g (2.78 mmol) of (1,2'-ethylene)(2,1'-ethylene)-bis(3-methylindene) under nitrogen flow. After cooling the solution to −78° C., 3.7 mL of a 1.57 mol/L solution of n-butyllithium in hexane (n-butyllithium: 5.81 mmol) was added dropwise over 30 min, and then, the temperature was raised to room temperature to stir for 8 h. The solvent was removed by distillation under reduced pressure and the residue was washed with hexane to obtain 1.03 g (2.58 mmol) of a dilithium salt as ether adduct (yield: 92.8%).

$^1$H-NMR (THF-d8):

(δ, ppm): 2.20 (6H, s), 3.25 (8H, s), 6.0-7.4 (8H, m)

(3) Preparation of (1,2'-ethylene)(2,1'-ethylene)-bis (3-methylindenyl)zirconium Dichloride Into 25 mL of toluene, was dispersed 1.03 g (2.58 mmol) of the ether adduct of dilithium salt of (1,2'-ethylene)(2,1'-ethylene)-bis(3-methylindene). The suspension was cooled to −78° C. After adding a dispersion of 0.60 g (2.58 mmol) of zirconium tetrachloride in 20 mL of toluene over 20 min, the temperature was raised to room temperature to stir for 8 h. The toluene supernatant was removed by filtration and the residue was extracted with two portions of 50 mL dichloromethane. The solvent was removed by distillation under reduced pressure and the residue was recrystallized from dichloromethane/hexane to obtain 0.21 g of (1,2'-ethylene) (2,1'-ethylene)-bis(3-methylindenyl)zirconium dichloride (yield: 17.3%).

$^1$H-NMR (CDCl$_3$):

(δ, ppm): 2.48 (6H, s), 3.33-3.85 (8H, m), 6.9-7 (8H, m)

EXAMPLE 1

Into a 10-L stainless steel autoclave, were charged 5 L of heptane, 5 mmol of triisobutylaluminum, and a catalyst component prepared by pre-contacting 19 mmol (in terms of aluminum) of methylaluminoxane available from Albemarle Co., Ltd. with 19 μmol of (1,2'-ethylene)(2,1'-ethylene)-bis(3-methylindenyl)zirconium dichloride obtained Synthesis Example 1 in toluene for 30 min. The temperature was raised to 40° C., and then a propylene gas was introduced until the total pressure reached 0.8 MPa (Gauge). Propylene was continuously fed to the autoclave though a pressure controller to maintain the polymerization pressure constant. After one hour, the content of the autoclave was taken out and dried under reduced pressure to obtain polypropylene.

The resin properties of the polypropylene were examined by the above evaluation methods. After compounding the following additives, the propylene homopolymer was extruded into pellets through a single-screw extruder "TLC 35-20 Model" available from Tsukada Juki Seisakusho Co., Ltd.

Additive formulation
Anti-oxidant:
 Iraganox 1010 available from Ciba Specialty Chemicals Corp.: 1,000 ppm
 Irgaphos 168 available from Ciba Specialty Chemicals Corp.: 1,000 ppm
Neutralizer:
 Calcium stearate: 1,000 ppm
Anti-Blocking Agent:
 silica-based anti-blocking agent: 2,300 ppm
Slipping Agent:
 Erucamide: 2,500 ppm The pellets were formed into film of a thickness of 50 μm by using a film-forming machine "TLC35-20 Model" (20 mmφ) available from Tsukada Juki Seisakusho Co., Ltd under the following conditions:
T-die outlet temperature: 190° C.
Take-off speed: 6.0 m/min
Chill roll temperature: 30° C.
Chill roll: mirror surface The film was measured by the above evaluation methods for films. The results are shown in Table 1.

COMPARATIVE EXAMPLE 1

The procedures of Example 1 were repeated except for using polypropylene F744NP (available from Idemitsu Petrochemical Co., Ltd.) which was produced by using a non-metallocene catalyst (Ti/Mg catalyst). The results are shown in Table 1.

TABLE 1

| | Example 1 | Comparative Example 1 |
|---|---|---|
| Resin Properties | | |
| [η] (dL/g) | 1.0 | 1.7 |
| [mmmm] (mol %) | 63.5 | — |
| [rrrr] (mol %) | 0.7 | — |
| [rrrr]/(1 − [mmmm]) | 0.019 | — |
| 2,1-Insertion (mol %) | 0 | — |
| 1,3-Insertion (mol %) | 0 | — |
| Mw/Mn | 1.8 | 4.3 |
| Tm (° C.) | 102 | 134 |
| ΔH (J/g) | 48 | 81 |
| 6 × (Tm − 140) | −228 | −36 |
| Boiling ether extract (wt %) | 5.0 | 2.0 |
| H25 (wt %) | 1 | 0 |
| Properties of Single-Layered Film | | |
| Tensile Modulus TM (MPa) | 580 | 655 |
| Impact Resistance (½ inch) (J/m²) | 20000 | 16000 |
| Internal Haze (%) | 1.5 | 1.8 |
| Heat-seal temperature HST (° C.) | 105 | 130 |
| 12.5 × HST − 900 | 412.5 | 725 |
| Anti-blocking properties (N/m²) | — | 63 |

EXAMPLE 2

(1) Preparation of Catalyst

Synthesis of (1,2'-dimethylsilylene)(2,1'-dimethylsilylene)-bis(3-n-butylindenyl)zirconium Dichloride Into a Schlenk tube, were charged 0.83 g (2.8 mmol) of (1,2'-dimethylsilylene)(2,1'-dimethylsilylene)-bis(indene) and 50 mL of ether. After the mixture was cooled to −78° C. and then added with 3.1 mL (5.0 mmol) of n-BuLi (as a 1.6 M hexane solution), the mixture was stirred at room temperature for 12 h. Then, the solvent was distilled away to obtain solids, which were washed with 20 mL of hexane to obtain 1.1 g (2.3 mmol) of a lithium salt as ether adduct. The lithium salt was dissolved in 50 mL of THF and cooled to −78° C. Then, the solution was stirred at room temperature for 12 h while slowly dropping 0.57 mL (5.3 mmol) of n-butyl bromide. By following the removal of the solvent by distillation, the extraction with 50 mL of hexane, and the removal of the solvent by distillation, 0.81 g (1.77 mmol) of (1,2'-dimethylsilylene)(2,1'-dimethylsilylene)-bis(3-n-butylindene) was obtained (yield: 74%).

Next, into a Schlenk tube, were charged 0.81 g (1.77 mmol) of (1,2'-dimethylsilylene)(2,1'-dimethylsilylene)$_m$-bis(3-n-butylindene) and 100 mL of ether under nitrogen flow. After the mixture was cooled to −78° C. and added with 2.7 mL (4.15 mmol) of n-BuLi (as a 1.54 M hexane solution), the mixture was stirred at room temperature for 12 h. The solvent was removed by distillation to obtain solids which were washed with hexane, thereby obtaining 0.28 g (1.43 mmol) of a lithium salt as ether adduct.

The lithium salt was dissolved in 50 mL of toluene under nitrogen flow. After the solution was cooled to −78° C., a suspension, which was cooled to −78° C. in advance, of 0.33 g (1.42 mmol) of zirconium tetrachloride in 50 mL of toluene was dropped into the solution. After dropping, the mixture was stirred at room temperature for 6 h and then filtered. The filtrate was distilled to remove the solvent, and the residue was recrystallized from dichloromethane to obtain 0.2 g (0.32 mmol) of (1,2'-dimethylsilylene)(2,1'-dimethylsilylene)-bis(3-n-butylindenyl)zirconium dichloride (yield: 22%).

$^1$H-NMR (90 MHz, CDCl$_3$):

(δ, ppm): 0.88, 0.99 (12H, dimethylsilylene), 0.7-1.0, 1.1-1.5 (18H, n-Bu), 7.0-7.6 (8H, benzene ring proton)

(2) Production of Propylene Polymer

Into a 200-L polymerization reactor, were fed the catalyst component obtained in Step (1) at a rate of 46.7 μmol/h, triisobutyl aluminum (TIBA) at a rate of 117 mmol/h, methylaluminoxane (MAO) at a rate of 46.7 mmol/h, heptane at a rate of 46.7 L/h, propylene at a rate of 3.4 kg/h, and hydrogen at a ratio $H_2/C_3$ of 0.20. The polymerization was conducted at 60° C. under 0.8 MPa (Gauge). The polymer solution was transferred into a deaerator, and then propylene and hydrogen were removed by introducing methanol at 10 mL/h. After compounding the following additives, the propylene polymer was extruded into pellets through a single-screw extruder "TLC 35-20 Model" available from Tsukada Juki Seisakusho Co., Ltd.

Additive formulation
  Anti-Oxidant:
    Irganox 1010 available from Ciba Specialty Chemicals Corp.: 500 ppm
    Irgaphos 168 available from Ciba Specialty Chemicals Corp.: 1,000 ppm
  Neutralizer:
    Calcium stearate: 1,000 ppm
Anti-Blocking Agent:
  Silica-based anti-blocking agent: 4,000 ppm
  Slipping Agent:
    Erucamide: 1,000 ppm (3) Film-Forming The pellets were formed into film of a thickness of 70 μm by using a film-forming machine "TLC35-20 Model" (20 mmφ) available from Tsukada Juki Seisakusho Co., Ltd under the following conditions.
  T-die outlet temperature: 220° C.
  Take-off speed: 3.0 m/min
  Chill roll temperature: 30° C.
  Chill roll: mirror surface The film was measured by the above evaluation methods for films. The results are shown in Table 2.

EXAMPLE 3

A film having a thickness of 70 μm was produced by the same method as in Example 2 except for using additives as formulated below. The film was evaluated by the above evaluation methods for films. The results are shown in Table 2.

Additive Formulation
  Anti-Oxidant:
    Irganox 1010 available from Ciba Specialty Chemicals Corp.: 1,000 ppm
    Irgaphos 168 available from Ciba Specialty Chemicals Corp.: 1,000 ppm
  Neutralizer:
    Calcium stearate: 1,000 ppm
  Anti-Blocking Agent:
    Silica-based anti-blocking agent: 4,000 ppm
  Slipping Agent:
    Erucamide: 1,000 ppm
  Nucleating Agent:
    Gelol MD (dimethylbenzylidenesorbitol) available from New Japan Chemical Co., Ltd.: 2,000 ppm

COMPARATIVE EXAMPLE 2

A 6-L glass reactor equipped with a stirrer was fully purged with nitrogen gas, and then charged with about 2,430 g of ethanol, 16 g of iodine and 160 g of metallic magnesium. The mixture was heated under stirring and the reaction was continued under reflux until the generation of hydrogen gas was no longer noticed, thereby obtaining a solid product. The reaction liquid containing the solid product was dried under reduced pressure to obtain a magnesium compound.

Into a 5-L glass reactor having been fully purged with nitrogen gas, were charged 160 g of the magnesium compound (not ground) prepared above, 80 mL of purified heptane, 24 mL of silicon tetrachloride, and 23 mL of diethyl phthalate. Then, 770 mL of titanium tetrachloride was added to the mixture with stirring while keeping the mixture at 80° C., and the reaction was allowed to proceed at 110° C. for 2 h. The resulting solid component was separated and washed with purified heptane at 90° C. The reaction was further allowed to proceed by adding 1,220 mL of titanium tetrachloride at 110° C. for 2 h. The product was fully washed with purified heptane to obtain a solid catalyst component (A).

The polymerization was conducted at 2.7 MPa·G by feeding into a 200-L polymerization reactor the above solid catalyst component at a rate of 6.0 g/h, triisobutylaluminum (TIBA) at a rate of 0.2 mol/h, 1-allyl-3,4-dimethoxybenzene (ADMB) at a rate of 0.012 mol/h, cyclohexylmethyldimethoxysilane (CHMDMS) at a rate of 0.012 mol/h, and propylene at a rate of 37 kg/h. The resin properties of the polypropylene thus obtained were evaluated in the same manner as in Example 2. Further, a film was produced and examined in the same manner as in Example 2. The results are shown in Table 2.

COMPARATIVE EXAMPLE 3

A film was produced and examined by the same method as in Example 2 except for using a pellet of polypropylene "Affinity PL1880" (trade name) available from Dow Chemicals Japan Limited. The results are shown in Table 2.

TABLE 2

|  | Examples | | Comparative Examples | |
|---|---|---|---|---|
|  | 2 | 3 | 2 | 3 |
| Resin Properties | | | | |
| [η] (dL/g) | 1.78 | 1.78 | 1.90 | — |
| H25 (wt %) | 20 | 20 | 30 | — |
| Tm (° C.) | not shown | 64 | 159 | — |
| ΔH (J/g) | not shown | 6.9 | 19 | — |
| 6 × (Tm − 140) | — | 456 | 114 | — |
| [mmmm] (mol %) | 39.5 | 39.5 | 72.2 | — |
| [rrrr]/(1 − [mmmm]) | 0.045 | 0.045 | 0.23 | — |
| 2,1-Insertion (mol %) | 0 | 0 | 0 | — |
| 1,3-Insertion (mol %) | 0 | 0 | 0 | — |
| Mw/Mn | 1.99 | 1.99 | 2.70 | — |
| Properties of Single-Layered Film | | | | |
| Tensile Modulus TM (MPa) | 32 | 40 | 512 | 34 |
| Elongation at break (MD) (%) | 680 | 680 | 450 | 560 |
| Internal Haze (%) | 3.0 | 2.0 | 15.8 | 1.9 |
| Anti-blocking properties (N/m$^2$) | 41*[1] | 40*[1] | *[2] | 57*[3] |
| Impact Resistance (½ inch) (J/m$^2$) | not broken | not broken | 9800 | not broken |

*[1]No whitening due to peeling.
*[2]Not peeled due to blocking.
*[3]Whitening due to peeling occurred.

EXAMPLE 4

Into a 10-L stainless steel autoclave, were charged 5 L of heptane and 5 mmol of triisobutylaluminum, and then a catalyst component prepared by pre-contacting 19 mmol (in terms of aluminum) of methylaluminoxane available from Albemarle Co., Ltd. with 19 μmol of (1,2'-dimethylsilylene) (2,1'-dimethlsilylene)-bis(3-n-buthylindenyl)zirconium dichloride obtained in Step (1) of Example 2 in toluene for 30 min. The mixture was heated to 40° C., and then a propylene gas was introduced into the autoclave until the total pressure reached 0.8 MPa (Gauge). During the polymerization, propylene was continuously fed into the autoclave though a pressure controller so as to maintain the reaction pressure constant. After one hour, the content of the autoclave was taken out, and dried under reduced pressure, thereby obtaining polypropylene. The polypropylene was tested by the above evaluation methods for resin properties. The results were shown in Table 3. The additives as formulated below were added to the polypropylene, and the mixture was granulated into pellets by extruding from an extruder "Model 135B available from Toshiba Kikai Co., Ltd.

Additive Formulation (1) Anti-Oxidant:
Irganox 1010 available from Ciba Specialty Chemicals Corp.: 1,000 ppm
Irgaphos 168 available from Ciba Specialty Chemicals Corp.: 1,000 ppm (2) Neutralizer:
Calcium stearate: 1,000 ppm (3) Anti-Blocking Agent:
Silica-based anti-blocking agent available from Fuji Silysia Co., Ltd.: 2,300 ppm (4) Slipping Agent:
Erucamide: 500 ppm Preparation of Laminate A multilayered laminate forming machine equipped with a feed block type T-die was used for forming resin into laminates. The feed block type T-die was provided with a T-die available from Koshin Engineering Co., Ltd., a feed block available from Tawaraya Tekkosho Co., Ltd., an extruder "EX40 Model" available from Placo. Co., Ltd. (No. 1), an extruder "VS30-26 Model" available from Tanabe Plastics Machinery Co., Ltd. (No. 2), and an extruder "RT-3-30 Model" available from Rikua Co., Ltd. (No. 3). The resin extruded from the extruder No. 2 was divided into two layers so as to produce a laminate having a 3-resin, 4-layered structure of No. 1/No. 2/No. 3/No. 2 in the order from the opposite side of the first chill-rolled surface.

By extruding the above polypropylene from the extruder No. 1, and E-105-GM (polypropylene available for Idemitsu Petrochemical Co., Ltd.) from the extruders Nos. 2 and 3, a laminate having an overall thickness of 30 μm with a thickness ratio of polypropylene layer/E-105GM layer=½. The resin temperature at the feed block and the T-die outlet was 230° C.; the chill roll temperature was 30° C.; and the take-off speed was 25 m/min. The laminate was examined by the above evaluation methods for laminates. The results are shown in Table 4.

COMPARATIVE EXAMPLE 4

The procedure of Example 4 was repeated except for using ethylene-vinylacetate copolymer (P250JC available from Du-Pont-Mitsui Polychemicals Co., Ltd) in place of polypropylene and using E-304 GP (polypropylene available for Idemitsu Petrochemical Co., Ltd.) in place of E-105 GM. The results are shown in Table 4.

TABLE 3

| Resin Properties | Example 4 |
| --- | --- |
| H25 (wt %) | 17 |
| Tm (° C.) | not shown |
| 6 × (Tm − 140) | — |
| ΔH (J/g) | not shown |
| [η] (dL/g) | 2.5 |
| [mmmm] (mol %) | 41 |
| [rrrr]/(1 − [mmmm]) | 0.049 |
| 2,1-Insertion (mol %) | 0 |
| 1,3-Insertion (mol %) | 0 |
| Mw/Mn | 2.4 |

TABLE 4

| Properties of Laminate | Example 4 | Comparative Example 4 |
| --- | --- | --- |
| Interlaminar strength | good | poor |
| Tensile modulus TM (MPa) | 550 | 540 |
| Heat-seal temperature (HST) (° C.) | 80 | 76 |
| Heat-seal strength (1) (N/15 m) | 1.17 | 0.71 |
| Heat-seal strength (2) (N/15 m) | 1.85 | 1.06 |
| Heat-seal strength (3) (N/15 m) | 2.42 | 2.68 |
| Heat-seal strength (4) (N/15 m) | 2.92 | 3.91 |
| Heat-seal strength (5) (N/15 m) | 7.08 | — |

Note:
Heat-seal strength was measured on a sample laminate prepared under the following conditions:
(1) heat-sealed at 65° C.;
(2) heat-sealed at 70° C.;
(3) heat-sealed at 75° C.;
(4) heat-sealed at 80° C.; and
(5) heat-sealed at 85° C..

INDUSTRIAL APPLICABILITY

The first polypropylene film of the invention is well-balanced between a tensile modulus and a heat seal temperature, less tacky and excellent in processability, transparency and impact resistance, and is therefore suitably applicable to the food packaging field and the medical fields. The second polypropylene film of the invention is less tacky and excellent in resistance to whitening due to peeling, softness and impact resistance, and is therefore suitably applicable to the food packaging fields and the medical fields. Further, the multilayered polyolefin resin laminate of the invention exhibits excellent heat sealability at low temperature as well as sufficient interlaminar strength without the use of an adhesive, and is therefore suitable as packaging films and sheets and the like.

What is claimed is:

1. A multilayered polyolefin resin laminate, wherein at least one outermost layer is made of a heat-sealing propylene homopolymer satisfying the following requirements of:
(1) having a component soluble in a 25° C. hexane in a content (H25) of 0 to 80% by weight;
(2) having, when measured by a differential scanning calorimeter (DSC), no melting point or a melting point Tm (° C.) satisfying the following formula:

$$\Delta H \geq 6 \times (Tm - 140)$$

wherein ΔH is a melting endotherm of 20 J/g or less,
(3) having a meso pentad fraction [mmmm] of from 20 to 60 mol %,
(4) having a tensile modulus of 100 MPa or lower, and wherein the heat-sealing propylene homopolymer is produced by polymerizing propylene in the presence of a polymerization catalyst comprising:

(A) a transition metal compound represented by the following formula (I):

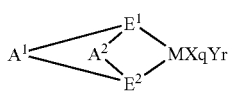

(I)

wherein M is a metal element of Groups 3 to 10 or lanthanum series of the Periodic Table;

$E^1$ and $E^2$ are the same or different and each independently is a ligand selected from the group consisting of substituted cyclopentadienyl, and substituted indenyl; and $E^1$ and $E^2$ are cross-linked via $A^1$ and $A^2$;

X is a σ-bonding ligand; and a plurality of X, if any, may be same or different and each X may be cross-linked with another X, $E^1$, $E^2$ or Y;

Y is a Lewis base; and a plurality of Y, if any, may be same or different and each Y may be cross-linked with another Y, $E^1$, $E^2$ or X;

$A^1$ and $A^2$ may be the same or different divalent silylene group for cross-linking two ligands $E^1$ and $E^2$;

q is an integer of 1 to 5 given by the formula, [(valence of M)−2]; and r is an integer of 0 to 3, and (B) at least one component selected from the group consisting of a compound (B-1) capable of forming an ionic complex by reacting with said transition metal compound (A) or a derivative thereof, and an aluminoxane (B-2).

2. The multilayered polyolefin resin laminate according to claim 1, wherein the heat-sealing propylene homopolymer contains a fraction (W25) eluted at 25° C. or lower determined by temperature programmed chromatography in an amount of from 20 to 100% by weight.

3. The multilayered polyolefin resin laminate according to claim 1, wherein the heat-sealing propylene homopolymer is a propylene homopolymer (A-1) having:

a racemic pentad fraction [rrrr] satisfying, together with 1−[mmmm], the following formula:

$$[rrrr]/(1-[mmmm]) \leq 0.1.$$

4. The multilayered polyolefin resin laminate according to claim 1, wherein the heat-sealing propylene homopolymer has a molecular weight distribution (Mw/Mn) of 4 or less as measured by gel permeation chromatography (GPC) and/or an intrinsic viscosity [η] of from 0.5 to 15.0 dL/g as measured at 135° C. in tetralin.

5. The multilayered polyolefin resin laminate according to claim 1, having at least one layer that is made of a crystalline propylene polymer other than the heat-sealing propylene homopolymer.

6. The multilayered polyolefin resin laminate according to claim 1, which is produced by T-die casting.

7. The multilayered polyolefin resin laminate according to claim 1, satisfying the following formula:

$$TM \geq 12.5 \times HST - 700$$

wherein TM is a tensile modulus (MPa) and HST is a heat seal temperature (° C.).

8. The multilayered polyolefin resin laminate according to claim 1, wherein the propylene homopolymer is produced by polymerizing propylene in the presence of a polymerization catalyst comprising (1,2'-dimethylsilylene)(2,1'-dimethylsilylene)-bis(3-n-butylindenyl)zirconium dichloride, triisobutylaluminum and methylaluminoxane.

9. The multilayered polyolefin resin laminate according to claim 1, wherein the propylene homopolymer is produced by polymerizing propylene in the presence of (1,2'-dimethylsilylene)(2,1'-dimethylsilylene)-bis(3-n-butylindenyl)zirconium dichloride and methylaluminoxane.

10. The multilayered polyolefin resin laminate according to claim 1, wherein the silylene group is selected from the group consisting of dimethylsilylene, diphenylsilylene, methylphenylsilylene, tetramethyldisilylene and diphenyldisilylene.

* * * * *